(12) United States Patent
Tsuchiya

(10) Patent No.: US 12,213,059 B2
(45) Date of Patent: Jan. 28, 2025

(54) COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventor: Keigo Tsuchiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 17/823,422

(22) Filed: Aug. 30, 2022

(65) Prior Publication Data

US 2023/0069058 A1    Mar. 2, 2023

(30) Foreign Application Priority Data

Aug. 31, 2021   (JP) .................................. 2021-141378
Jun. 23, 2022   (JP) .................................. 2022-101445

(51) Int. Cl.
*H04W 48/16*   (2009.01)
*H04W 76/10*   (2018.01)
*H04W 88/08*   (2009.01)

(52) U.S. Cl.
CPC ........... *H04W 48/16* (2013.01); *H04W 76/10* (2018.02); *H04W 88/08* (2013.01)

(58) Field of Classification Search
CPC ...... H04W 48/16; H04W 76/10; H04W 88/08
See application file for complete search history.

(56) References Cited

U.S. PATENT DOCUMENTS

| | | | | |
|---|---|---|---|---|
| 8,351,381 | B1 * | 1/2013 | Pawar .................. | H04W 36/22 370/329 |
| 8,385,266 | B1 * | 2/2013 | Vargantwar ........... | H04W 88/06 370/328 |
| 11,853,631 | B2 * | 12/2023 | Sugawara ............. | G06F 3/1292 |
| 2002/0021307 | A1 * | 2/2002 | Glenn ..................... | H04L 51/04 715/753 |
| 2009/0248849 | A1 * | 10/2009 | Ishimoto ............... | G06F 3/1204 709/223 |

(Continued)

FOREIGN PATENT DOCUMENTS

JP   2016-127545 A   7/2016

*Primary Examiner* — Ajay Cattungal
(74) *Attorney, Agent, or Firm* — Canon U.S.A., Inc. IP Division

(57) ABSTRACT

A communication apparatus configured to communicate with an information processing apparatus, the communication apparatus includes a first control unit configured to perform, in a case where a predetermined operation is performed on the communication apparatus, first control to start both a first state to communicate with the information processing apparatus using a first protocol and a second state to communicate with the information processing apparatus using a second protocol different from the first protocol, and a second control unit configured to perform, in a case where connection information for use by the communication apparatus to connect to an access point is obtained from the information processing apparatus via communication with the information processing apparatus using the second protocol based on predetermined information transmitted using the first protocol, second control to establish a connection between the communication apparatus and the access point by using the connection information.

21 Claims, 11 Drawing Sheets

(56) References Cited

U.S. PATENT DOCUMENTS

| | | | |
|---|---|---|---|
| 2012/0124258 A1* | 5/2012 | Tailliet | G06F 13/4295 |
| | | | 710/106 |
| 2015/0264141 A1* | 9/2015 | Yamaura | H04L 43/04 |
| | | | 709/228 |
| 2023/0061893 A1* | 3/2023 | Sugawara | H04N 1/0035 |

* cited by examiner

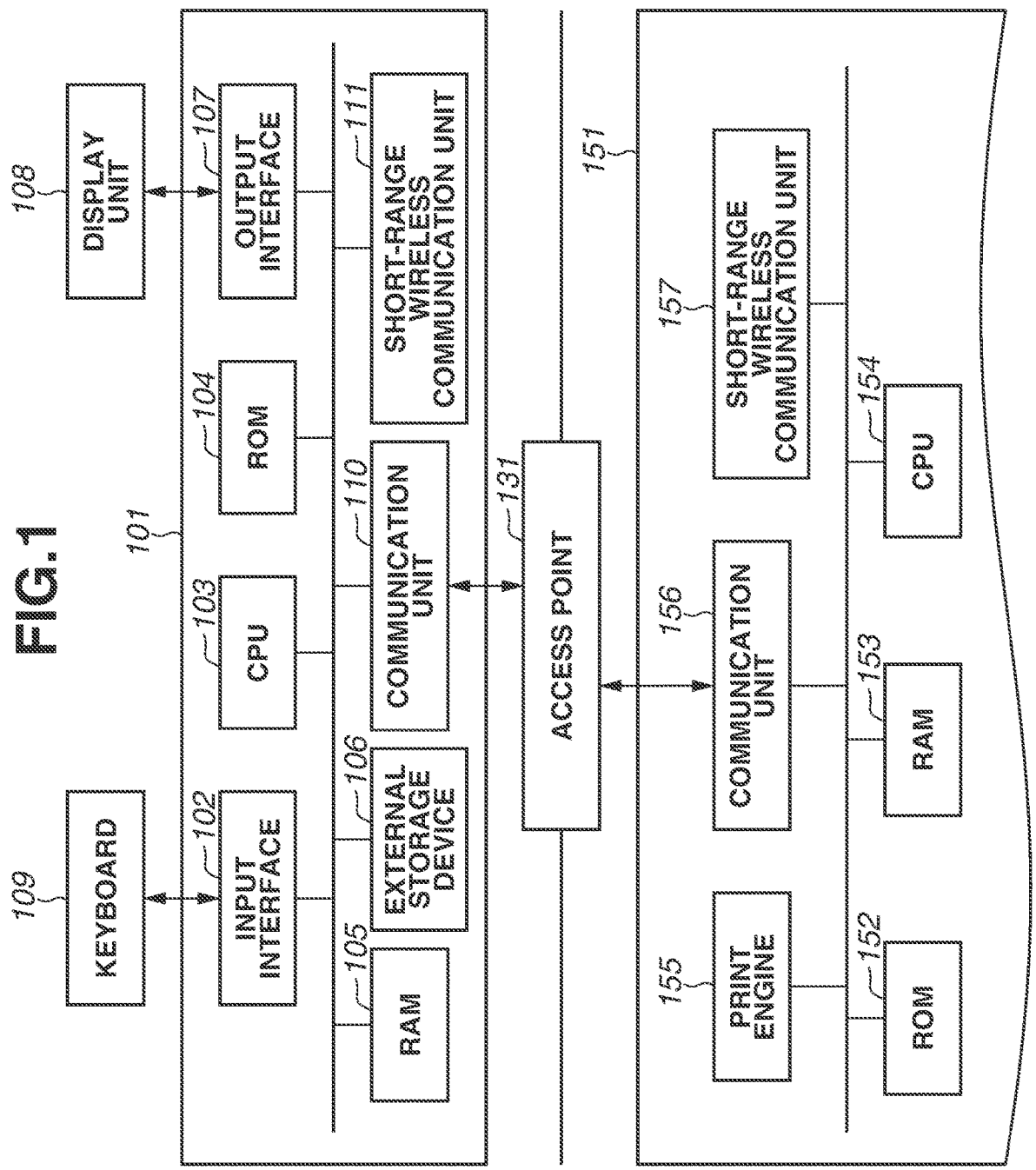

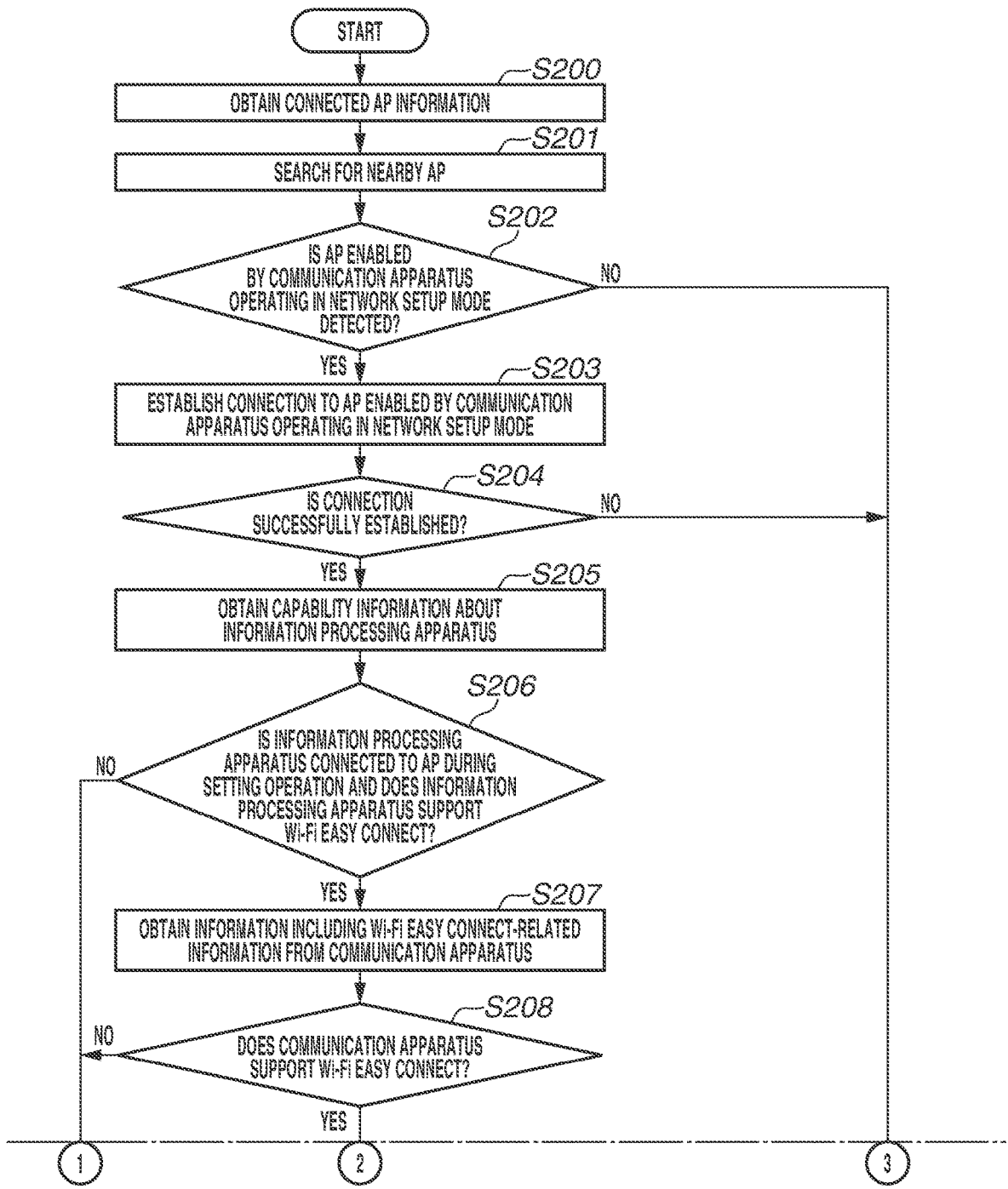

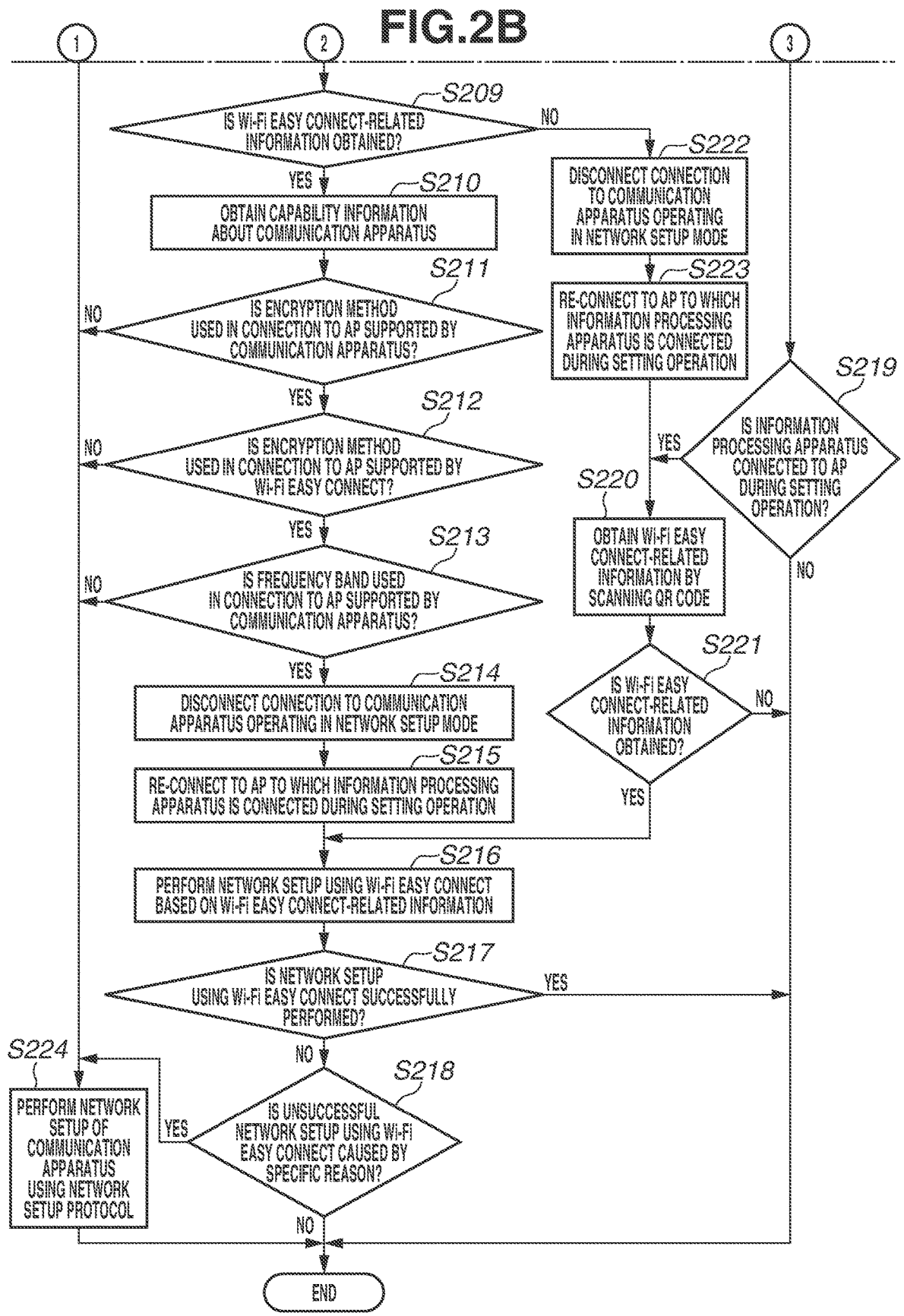

COMMUNICATION APPARATUS, METHOD FOR CONTROLLING THE SAME, AND STORAGE MEDIUM

BACKGROUND OF THE INVENTION

Field of the Invention

The present invention relates to a communication apparatus, a method for controlling the same, and a storage medium.

Description of the Related Art

A technique discussed in Japanese Patent Application Laid-Open No. 2016-127545 is in widespread use for establishment of a connection between a communication apparatus and an external apparatus. The connection is established by transmitting information on an access point serving as the external apparatus from an information processing apparatus, such as a personal computer (PC) to the communication apparatus, such as a printer.

While the function of transmitting connection information for establishment of a connection between a communication apparatus and an access point and establishing the connection between the communication apparatus and the access point becomes popular, there is a demand for improvement in convenience of the function.

SUMMARY OF THE INVENTION

The present invention is based on the above-described issue and is directed to improving convenience of the function of establishing a connection between a communication apparatus and an access point.

According to an aspect of the present invention, a communication apparatus configured to communicate with an information processing apparatus, the communication apparatus includes a first control unit configured to perform, in a case where a predetermined operation is performed on the communication apparatus, first control to start both a first state to communicate with the information processing apparatus using a first protocol and a second state to communicate with the information processing apparatus using a second protocol different from the first protocol, a transmission unit configured to transmit predetermined information for use in communication with the information processing apparatus using the second protocol via communication with the information processing apparatus using the first protocol, a communication unit configured to communicate with the information processing apparatus using the second protocol based on the predetermined information transmitted using the first protocol, and a second control unit configured to perform, in a case where connection information for use by the communication apparatus to connect to an access point is obtained from the information processing apparatus via communication with the information processing apparatus using the second protocol based on the predetermined information transmitted using the first protocol, second control to establish a connection between the communication apparatus and the access point by using the connection information.

Further features of the present invention will become apparent from the following description of exemplary embodiments with reference to the attached drawings.

BRIEF DESCRIPTION OF THE DRAWINGS

FIG. 1 is a diagram illustrating a configuration of an information processing apparatus, a communication apparatus, and an access point.

FIGS. 2A and 2B are flowcharts illustrating a process that is performed by the information processing apparatus in network setup processing.

DESCRIPTION OF THE EMBODIMENTS

Figure 3:
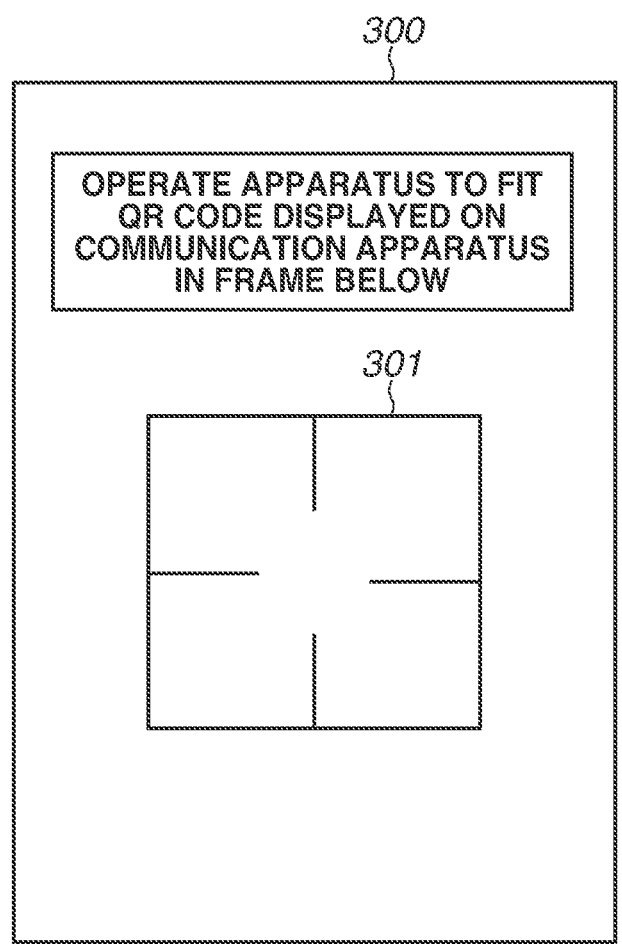
FIG. 3 is a diagram illustrating an example of a screen for capturing an image of a quick response code (QR code®) displayed by a setting application.

Various exemplary embodiments of the present invention will be described below with reference to the drawings. It should be understood that the scope of the invention includes changes and modifications that are made to the below-described exemplary embodiments as needed by a person skilled in the art without departing from the spirit of the invention.

An information processing apparatus and a communication apparatus of a communication system according to a first exemplary embodiment will be described below. While a smartphone will be described below as an example of an information processing apparatus according to the present exemplary embodiment, the information processing apparatuses according to the present exemplary embodiment are not limited to smartphones. For example, various devices, such as a mobile terminal, a personal computer (PC), a tablet terminal, a personal digital assistant (PDA), and a digital camera, are applicable as an information processing apparatus according to the present exemplary embodiment. Further, while a printer will be described below as an example of a communication apparatus according to the present exemplary embodiment, communication apparatuses according to the present exemplary embodiment are not limited to printers, and various devices capable of wirelessly communicating with an information processing apparatus are applicable as a communication apparatus according to the present invention. For example, printers, such as inkjet printers, full-color laser beam printers, and monochrome printers, are applicable. Not only printers but also copy machines, facsimile devices, mobile terminals, smartphones, laptop PCs, tablet terminals, PDAs, digital cameras, music reproduction devices, televisions, and smart speakers are applicable. Furthermore, multi-function peripherals that include a plurality of functions, such as a copy function, a facsimile function, and a print function are also applicable.

In the present exemplary embodiment, in a case where an information processing apparatus supports a function of using a protocol referred to as Wi-Fi Easy Connect™, the information processing apparatus can execute the function. Wi-Fi Easy Connect is used for processing using Device Provisioning Protocol (hereinafter, "DPP") developed by Wi-Fi Alliance® in network setup of another device. The network setup processing of another device is specifically a process of connecting the other device to an access point forming a network. In the network setup processing using Wi-Fi Easy Connect, a device operating as a "configurator" (hereinafter, the device will be referred to as "configurator device") and a device operating as an "enrollee" (hereinafter, the device will be referred to as "enrollee device") communicate with each other. The configurator device obtains bootstrapping information from the enrollee device. The bootstrapping information includes, for example, identification information (media access control (MAC) address) about the enrollee device and public key information for use in secure communication with the enrollee device. According to the present exemplary embodiment, the bootstrapping information will be described as "Wi-Fi Easy Connect-related information". Other information can also be used as Wi-Fi Easy Connect-related information. The configurator device performs wireless communication with the enrollee device using the obtained bootstrapping information. Specifically, for example, the configurator device communicates with the enrollee device using a public key included in the bootstrapping information. The configurator device further generates a common key, based on the information obtained through the communication, and transmits information encrypted using the common key to the enrollee device. The information that is transmitted is specifically, for example, connection information for use in connecting to an access point. The enrollee device establishes a wireless connection with the access point using the connection information received from the configurator device. In the network setup processing using Wi-Fi Easy Connect according to the present exemplary embodiment, an information processing apparatus that supports Wi-Fi Easy Connect operates as a configurator device whereas a communication apparatus that supports Wi-Fi Easy Connect operates as an enrollee device.

First, a configuration of an information processing apparatus according to the present exemplary embodiment and a communication apparatus capable of communicating with the information processing apparatus according to the present exemplary embodiment will be described below with reference to a block diagram in FIG. 1. While the configuration below is described as an example according to the present exemplary embodiment, the present exemplary embodiment is applicable to any apparatuses capable of communicating with a communication apparatus, and functions are not specifically limited to those illustrated in the drawing.

An information processing apparatus 101 is an information processing apparatus according to the present exemplary embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 110, and a short-range wireless communication unit 111. The CPU 103, the ROM 104, and the RAM 105 form a computer of the information processing apparatus 101.

The input interface 102 is an interface for receiving, from a user, data input and operation instructions that are entered by the user operating an operation unit, such as a keyboard 109. The operation unit can be a physical keyboard or a physical button or can be a software keyboard or a software button displayed on the display unit 108. Specifically, the input interface 102 can receive input from a user via the display unit 108.

The CPU 103 is a system control unit and controls entire operation of the information processing apparatus 101.

The ROM 104 stores fixed data, such as control programs to be executed by the CPU 103, data tables, and an embedded operating system (hereinafter, referred to as "embedded OS") program. According to the present exemplary embodiment, the control programs stored in the ROM 104 control software performance, such as scheduling, task switching, and interruption processing, under management by the embedded OS stored in the ROM 104.

The RAM 105 includes a static RAM (SRAM) that needs backup power. The RAM 105 can store important data, such as program control variable numbers, without losing the data because the data is retained by a primary battery (not illustrated) for data backup. The RAM 105 further includes a memory area for storing setting information about the information processing apparatus 101 and management data on the information processing apparatus 101. The RAM 105 is also used as a main memory and a work memory of the CPU 103.

The external storage device 106 stores an application program for network setup of a communication apparatus 151 (hereinafter, the application program will be referred to as "setting application") and a print information generation program for generation of print information interpretable by the communication apparatus 151. The setting application is an application program to be used for Wi-Fi Easy Connect and the like to configure settings of an access point that is a connection destination of the communication apparatus 151. The setting application can include functions other than a network setup function. For example, the setting application can include a function of causing the communication apparatus 151 to perform printing, a function of causing the communication apparatus 151 to perform scanning a set document, and/or a function of checking a state of the communication apparatus 151. The setting application is stored in the external storage device 106 by, for example, installing the setting application from an external server through Internet communication via the communication unit 110. Further, the external storage device 106 stores various programs, such as a program for controlling transmission and reception of information to and from the communication apparatus 151 connected via the communication unit 110, and various types of information for use by the programs.

The output interface 107 is an interface that controls the display unit 108 to display data and a notification of a state of the information processing apparatus 101.

The display unit 108 includes a light emitting diode (LED) and/or a liquid crystal display (LCD) and displays data and a notification of a state of the information processing apparatus 101.

The communication unit 110 is a component for establishing a connection to devices, such as the communication apparatus 151 and an access point 131, and performing data communication. For example, the communication unit 110 is connectable to an internal access point (not illustrated) in the communication apparatus 151. When the communication unit 110 and the internal access point in the communication apparatus 151 are connected to each other, communication between the information processing apparatus 101 and the communication apparatus 151 is enabled. The communication unit 110 can directly communicate with the communication apparatus 151 via wireless communication or can communicate with the communication apparatus 151 via an external apparatus outside the information processing apparatus 101 and the communication apparatus 151. The term "external apparatus" refers to an external access point (the access point 131) outside the information processing apparatus 101 and the communication apparatus 151 and an apparatus that is not an access point but can relay communication. According to the present exemplary embodiment, a wireless communication method that the communication unit 110 uses is Wi-Fi®, which is a communication standard based on the Institute of Electrical and Electronics Engineers (IEEE) 802.11 series. Wi-Fi Easy Connect described above is used by communication with the communication unit 110. Further, the access point 131 is, for example, a device, such as a wireless local area network (wireless LAN) router. According to the present exemplary embodiment, a method by which the information processing apparatus 101 and the communication apparatus 151 connect directly to each other without an external access point is referred to as "direct connection method", and direct communication is communication via a direct connection. Further, a method by which the information processing apparatus 101 and the communication apparatus 151 connect to each other via an external access point is referred to as "infrastructure connection method", and infrastructure communication is communication via an infrastructure connection.

The short-range wireless communication unit 111 is a component that wirelessly connects to an apparatus, such as the communication apparatus 151, within a short distance and communicates data. The short-range wireless communication unit 111 performs communication using a communication method different from a communication method that is used by the communication unit 110. The short-range wireless communication unit 111 can connect to, for example, a short-range wireless communication unit 157 in the communication apparatus 151. Examples of communication methods are near-field communication (NFC), Bluetooth® Classic, Bluetooth® Low Energy, and Wi-Fi Aware™.

According to the present exemplary embodiment, the information processing apparatus 101 performs the network setup using Wi-Fi Easy Connect using the OS of the information processing apparatus 101, based on an instruction to perform network setup processing by the setting application.

The communication apparatus 151 is a communication apparatus according to the present exemplary embodiment. The communication apparatus 151 includes a ROM 152, a RAM 153, a CPU 154, a print engine 155, a communication unit 156, and the short-range wireless communication unit 157. The ROM 152, the RAM 153, and the CPU 154 form a computer of the communication apparatus 151.

The communication unit 156 includes an access point, serving as the internal access point in the communication apparatus 151, for connecting to an apparatus, such as the information processing apparatus 101. The access point is connectable to the communication unit 110 of the information processing apparatus 101. When the communication unit 156 enables the access point, the communication apparatus 151 becomes operable as an access point. The communication unit 156 can wirelessly connect to the information processing apparatus 101 directly or via the access point 131. According to the present exemplary embodiment, a wireless communication method that the communication unit 156 uses is the IEEE 802.11 series communication standards. Further, the term "Wi-Fi communication" below refers to the IEEE 802.11 series communication standards. In a case where the communication apparatus 151 supports Wi-Fi Easy Connect, the communication apparatus 151 performs the network setup using Wi-Fi Easy Connect described above via communication by the communication unit 156. The communication unit 156 can include hardware configured to function as an access point or can operate as an access point using software for causing the communication unit 156 to function as an access point.

The communication apparatus 151 according to the present exemplary embodiment is operable in an infrastructure mode and a peer-to-peer (P2P) mode. The infrastructure mode and the P2P mode are modes for communication using the communication unit 156.

The infrastructure mode is a mode in which the communication apparatus 151 communicates with another apparatus, such as the information processing apparatus 101, via an external apparatus (e.g., the access point 131) forming a network. A connection to an external access point that is established by the communication apparatus 151 operating in the infrastructure mode will be referred to as "infrastructure connection". According to the present exemplary embodiment, the communication apparatus 151 operates as a child device while the external access point operates as a parent device in the infrastructure connection. According to the present exemplary embodiment, the parent device is a device that determines a communication channel for use in the network to which the parent device belongs, and the child device is a device that uses the communication channel determined by the parent device, without determining a communication channel for use in a network to which the child device belongs.

The P2P mode is a mode in which the communication apparatus 151 directly communicates with another apparatus, such as the information processing apparatus 101, without an external apparatus forming a network. According to the present exemplary embodiment, the P2P mode includes an access point (AP) mode in which the communication apparatus 151 operates as an access point. Connection information (service set identifier (SSID), password) about the access point that is enabled in the communication apparatus 151 during the AP mode can be set as desired by a user. The P2P mode can also include, for example, a Wi-Fi Direct mode in which the communication apparatus 151 performs communication using Wi-Fi Direct®. Determination of which one of a plurality of devices that supports Wi-Fi Direct is to operate as a parent device is made by, for example, a sequence referred to as "Group Owner Negotiation". A parent device can be determined without performing a Group Owner Negotiation. An apparatus that supports Wi-Fi Direct and plays the role as a parent device is specifically referred to as "Group Owner". A direct connection, to another apparatus, established by the communication apparatus 151 operating in the P2P mode will be referred to as "direct connection". According to the present exemplary embodiment, the communication apparatus 151 operates as a parent device while the other apparatus operates as a child device in the direct connection.

According to the present exemplary embodiment, the communication apparatus 151 is operable in a network setup mode by receiving a predetermined operation from a user. The network setup mode is a mode for execution of network setup of the communication apparatus 151. In a case where the communication apparatus 151 is to operate in the network setup mode, the communication apparatus 151 uses the communication unit 156 to operate as a network setup access point that is enabled during operation in the network setup mode. The network setup access point is a different access point from the access point that is enabled during the AP mode described above. Further, a SSID of the network setup access point includes a predetermined character string that is recognizable by the setting application of the information processing apparatus 101.

The network setup access point is an access point that does not require a password in establishment of a connection. The communication apparatus 151 operating in the network setup mode uses a predetermined communication protocol (network setup communication protocol) in communication with the information processing apparatus 101 connected to the network setup access point. The network setup communication protocol is specifically, for example, Simple Network Management Protocol (SNMP). In a case where a predetermined time passes after the communication apparatus 151 starts operating in the network setup mode, the communication apparatus 151 stops operating in the network setup mode and disables the network setup access point for the following reason. Specifically, since the network setup access point is an access point that does not require a password as described above, leaving the network setup access point in the enabled state for a long time increases a possibility of receiving connection requests from inappropriate devices. Alternatively, the network setup access point can be an access point that requires a password. In this case, a password for use in connection to the network setup access point is a password that is fixed (i.e., a user cannot change) and is obtained in advance by the setting application.

Furthermore, according to the present exemplary embodiment, the communication apparatus 151 is also operable in a mode for network setup of the communication apparatus 151 using a different communication protocol from the network setup communication protocol, by receiving a predetermined operation from a user. According to the present exemplary embodiment, the different communication protocol from the network setup communication protocol is DPP described above, and the mode will be referred to as "DPP standby mode". In a case where the communication apparatus 151 operating in the DPP standby mode receives a DPP network setup request from the information processing apparatus 101, the communication apparatus 151 performs network setup using DPP as described below. Thus, the DPP standby mode is, in other words, a mode of the communication apparatus 151 waiting for a DPP network setup request. The DPP standby mode will be described below with reference to FIG. 9.

According to the present exemplary embodiment, an operation in the network setup mode and an operation in the DPP standby mode can be performed simultaneously (in parallel). Performing an operation in the network setup mode and an operation in the DPP standby mode simultaneously (in parallel) will be referred to as "simultaneous operation". According to the present exemplary embodiment, a network interface for use in communication in the network setup mode and a network interface for use in communication in the DPP standby mode are interfaces different from each other. The interface for use in communication in the network setup mode is an interface for direct communication, and the interface for use in communication in the DPP standby mode is an interface for infrastructure communication.

The communication apparatus 151 according to the present exemplary embodiment includes a single wireless chip for Wi-Fi communication, and operations of the interface for direct communication and the interface for infrastructure communication are realized by the single wireless chip. Specifically, the wireless chip for Wi-Fi communication switches, by time division, between a communication state in the network setup mode and a communication state in the DPP standby mode. When an interface that is used is switched, a channel for use in communication by the interface is also switched. The communication apparatus 151 is not limited to the foregoing configuration and can include a plurality of wireless chips. In such a case, the operation of the interface for direct communication and the operation of the interface for infrastructure communication can be realized by respective wireless chips (e.g., first wireless chip, second wireless chip). Further, in this case, an operation by the first wireless chip in the communication state in the network setup mode and an operation by the second wireless chip in the communication state in the DPP standby mode can be performed in parallel.

The short-range wireless communication unit 157 is a component for wirelessly connecting to an apparatus, such as the information processing apparatus 101, within a short distance and is connectable to, for example, the short-range wireless communication unit 111 in the information processing apparatus 101. Examples of communication methods are NFC, Bluetooth® Classic, Bluetooth® Low Energy, and Wi-Fi Aware.

The RAM 153 includes a SRAM that is supplied with backup power. The RAM 153 can store important data, such as program control variable numbers, without losing the data because the data is retained by a primary battery (not illustrated) for data backup. The RAM 153 further includes a memory area for storing setting information about the communication apparatus 151 and management data on the communication apparatus 151. The RAM 153 is also used as a main memory and a work memory of the CPU 154 and stores a reception buffer for temporarily storing print information received from the information processing apparatus 101 and various types of information.

The ROM 152 stores fixed data, such as control programs, data tables, and an OS program that are executed by the CPU 154. According to the present exemplary embodiment, the control programs stored in the ROM 152 control software performance, such as scheduling, task switching, and interruption processing, under management by the embedded OS stored in the ROM 152.

The CPU 154 is a system control unit and controls the entire operation of the communication apparatus 151.

The print engine 155 forms an image on a recording medium by applying a recording agent, such as ink, to the recording medium, such as paper, based on information stored in the RAM 153 or a print job received from the information processing apparatus 101 and outputs the print result. Since print jobs transmitted from the information processing apparatus 101 generally have a large data amount, a communication method capable of performing high-speed communication is used for communication of a print job. Thus, the communication apparatus 151 receives print jobs via the communication unit 156, which can communicate at a higher speed than a communication speed of the short-range wireless communication unit 157.

A memory, such as an external hard disk drive (external HDD) or a secure digital (SD) card can be attached as an optional device to the communication apparatus 151, and information stored in the communication apparatus 151 can also be stored in the memory.

FIGS. 2A and 2B are flowcharts illustrating a process that is performed by the information processing apparatus 101 in the network setup processing according to the present exemplary embodiment. The procedure of the flowchart in FIGS. 2A and 2B is realized by, for example, the CPU 103 reading the setting application stored in the ROM 104 or the external storage device 106 to the RAM 105 and executing the read setting application. Further, the procedure of the flowcharts in FIGS. 2A and 2B are started in response to a predetermined network setup operation (hereinafter, the predetermined network setup operation will be referred to as "setting operation") performed on a screen displayed by the setting application.

First, in step S200, the CPU 103 obtains information about an access point to which the information processing apparatus 101 is wirelessly connected using Wi-Fi at least when the setting operation is performed (hereinafter, the access point will be referred to as "connected AP"). According to the present exemplary embodiment, since the information processing apparatus 101 does not perform connection destination access point switching processing after the setting operation is performed, the access point is also an access point to which the information processing apparatus 101 is currently connected in step S200. The information includes information (SSID, encryption method information) for establishment of a connection to the access point to which the information processing apparatus 101 is wirelessly connected using Wi-Fi. The obtained information is stored in a predetermined storage area of the memory of the information processing apparatus 101. The foregoing processing is skipped in a case where the information processing apparatus 101 has no Wi-Fi connections to any access points when the setting operation is performed.

Next, in step S201, the CPU 103 instructs the OS of the information processing apparatus 101 to search for an access point near the information processing apparatus 101 and obtains the search result by the setting application.

Next, in step S202, the CPU 103 determines whether the search result obtained in step S201 includes an access point that is enabled by the communication apparatus 151 operating in the network setup mode. As described above, according to the present exemplary embodiment, a SSID of an access point that is enabled by the communication apparatus 151 operating in the network setup mode includes the predetermined character string recognized in advance by the setting application. Thus, in the determination, specifically, the CPU 103 determines whether the search result obtained in step S201 includes an access point having a SSID including the predetermined character string. In a case where the CPU 103 determines that the search result obtained in step S201 includes an access point that is enabled by the communication apparatus 151 operating in the network setup mode (YES in step S202), the processing proceeds to step S203. In a case where the CPU 103 determines that the search result obtained in step S201 does not include an access point that is enabled by the communication apparatus 151 operating in the network setup mode (NO in step S202), the processing proceeds to step S219.

In step S203, the CPU 103 attempts to establish a Wi-Fi connection between the information processing apparatus 101 and the access point that is included in the search result and is enabled by the communication apparatus 151 operating in the network setup mode. The Wi-Fi connection corresponds to a Wi-Fi connection between the communication apparatus 151 operating in the network setup mode and the information processing apparatus 101.

Next, in step S204, the CPU 103 determines whether a Wi-Fi connection is successfully established in step S203. In a case where the CPU 103 determines that a Wi-Fi connection is successfully established in step S203 (YES in step S204), the processing proceeds to step S205. In a case where the CPU 103 determines that establishment of a Wi-Fi connection is unsuccessful in step S203 (NO in step S204), the processing proceeds to step S219.

In step S205, the CPU 103 obtains capability information about the information processing apparatus 101 from the OS. According to the present exemplary embodiment, the capability information includes information indicating whether the information processing apparatus 101 supports Wi-Fi Easy Connect. The capability information includes different information for different model types and different model numbers of the information processing apparatus 101.

Next, in step S206, the CPU 103 determines whether the information processing apparatus 101 is Wi-Fi connected to the access point when the setting operation is performed and whether the information processing apparatus 101 supports Wi-Fi Easy Connect. In the determination, in a case where, for example, the information processing apparatus 101 does not have a Wi-Fi connection to the access point during the setting operation, the CPU 103 determines that the information processing apparatus 101 is not Wi-Fi connected to the access point when the setting operation is performed (NO in step S206). Further, in a case where, for example, the information processing apparatus 101 is Wi-Fi connected to the access point when the setting operation is performed, but does not support Wi-Fi Easy Connect, the CPU 103 determines that and Wi-Fi Easy Connect is unsupported (NO in step S206). The determination of whether the information processing apparatus 101 is Wi-Fi connected to the access point when the setting operation is performed is made based on whether connected AP information is stored in the predetermined storage area. The determination of whether the information processing apparatus 101 supports Wi-Fi Easy Connect is made based on the content of the capability information obtained in step S205. In a case where the CPU 103 determines that the information processing apparatus 101 is Wi-Fi connected to the access point when the setting operation is performed and supports Wi-Fi Easy Connect (YES in step S206), the processing proceeds to step S207. In either cases of where the CPU 103 determines that the information processing apparatus 101 is not Wi-Fi connected to the access point when the setting operation is performed and the CPU 103 determines that Wi-Fi Easy Connect is unsupported (NO in step S206), the processing proceeds to step S224.

In step S207, the CPU 103 attempts to obtain various types of information from the communication apparatus 151 via the Wi-Fi connection between the information processing apparatus 101 and the access point enabled by the communication apparatus 151 operating in the network setup mode. As described above, the network setup communication protocol is used in the communication via a Wi-Fi connection between the information processing apparatus 101 and the access point enabled by the communication apparatus 151 operating in the network setup mode. The obtained information includes, for example, Wi-Fi Easy Connect-related information described above and information indicating whether the communication apparatus 151 supports Wi-Fi Easy Connect. The information indicating whether the communication apparatus 151 supports Wi-Fi Easy Connect is information indicating whether the communication apparatus 151 supports DPP and operates in the DPP standby mode described below. In a case where the communication apparatus 151 does not support Wi-Fi Easy Connect, information indicating that the communication apparatus 151 does not support Wi-Fi Easy Connect is obtained, and Wi-Fi Easy Connect-related information is not obtained.

In a case where the communication apparatus 151 does not support Wi-Fi Easy Connect, both Wi-Fi Easy Connect-related information and information indicating whether the communication apparatus 151 supports Wi-Fi Easy Connect may not be obtained. In general, Wi-Fi Easy Connect-related information can be obtained also by scanning a QR code, which corresponds to the Wi-Fi Easy Connect-related information, displayed on a display unit of the communication apparatus 151 by using a camera unit of the information processing apparatus 101. According to the present exemplary embodiment, however, Wi-Fi Easy Connect-related information can be obtained via the Wi-Fi connection between the information processing apparatus 101 and the access point enabled by the communication apparatus 151 operating in the network setup mode. With this configuration, the information processing apparatus 101 can obtain Wi-Fi Easy Connect-related information even in a case where the communication apparatus 151 does not include a display unit for displaying QR codes or the information processing apparatus 101 does not include a camera unit for scanning QR codes.

Next, in step S208, the CPU 103 determines whether the communication apparatus 151 supports Wi-Fi Easy Connect, based on the information obtained in step S207. A case where the communication apparatus 151 supports Wi-Fi Easy Connect is a case where the communication apparatus 151 supports DPP described above and operates in the DPP standby mode. In a case where information indicating that the communication apparatus 151 supports Wi-Fi Easy Connect is obtained, the CPU 103 determines that the communication apparatus 151 supports Wi-Fi Easy Connect (YES in step S208). In a case where information indicating that the communication apparatus 151 supports Wi-Fi Easy Connect is not obtained, the CPU 103 determines that the communication apparatus 151 does not support Wi-Fi Easy Connect (NO in step S208). In a case where the CPU 103 determines that the communication apparatus 151 supports Wi-Fi Easy Connect (YES in step S208), the processing proceeds to step S209. In a case where the CPU 103 determines that the communication apparatus 151 does not support Wi-Fi Easy Connect (NO in step S208), the processing proceeds to step S224. In a case where information is unsuccessfully obtained in step S207, the CPU 103 determines that the communication apparatus 151 does not support Wi-Fi Easy Connect (NO in step S208).

Next, in step S209, the CPU 103 determines whether Wi-Fi Easy Connect-related information is obtained from the communication apparatus 151 in step S207. In a case where the CPU 103 determines that Wi-Fi Easy Connect-related information is obtained from the communication apparatus 151 in step S207 (YES in step S209), the processing proceeds to step S210. In a case where the CPU 103 determines that Wi-Fi Easy Connect-related information is unsuccessfully obtained from the communication apparatus 151 in step S207 (NO in step S209), the processing proceeds to step S222. A case where the CPU 103 determines that Wi-Fi Easy Connect-related information is unsuccessfully obtained from the communication apparatus 151 in step S207 (NO in step S209) is a case where, for example, information indicating that the communication apparatus 151 supports Wi-Fi Easy Connect is obtained but Wi-Fi Easy Connect-related information is not obtained due to a communication error or the like.

In step S210, the CPU 103 obtains capability information about the communication apparatus 151 via the Wi-Fi connection between the information processing apparatus 101 and the access point enabled by the communication apparatus 151 operating in the network setup mode. According to the present exemplary embodiment, the capability information about the communication apparatus 151 includes information about an encryption method supported by the communication apparatus 151 and information indicating a frequency band supported by the communication apparatus 151. Examples of an encryption method supported by the communication apparatus 151 are Wi-Fi Protected Access® (WPA™), WPA2™, and WPA3™. The information indicating a frequency band supported by the communication apparatus 151 can be information (channel information) indicating a communication channel corresponding to the frequency band supported by the communication apparatus 151. The foregoing processing can be skipped in a configuration in which the determination about an encryption method supported by the communication apparatus 151 and the determination about a frequency band supported by the communication apparatus 151 are not performed. The capability information can be included in advance in the setting application. Specifically, the CPU 103 identifies capability information corresponding to the communication apparatus 151 from among a plurality of pieces of capability information that is included in advance in the setting application and is prepared for different types and different model numbers of communication apparatuses, and the CPU 103 can obtain the identified capability information from the setting application.

Next, in step S211, the CPU 103 determines whether an encryption method used in the connection to the connected AP is an encryption method supported by the communication apparatus 151, based on the capability information obtained in step S210. According to the present exemplary embodiment, WPA, WPA2, and WPA3 are encryption methods supported by the communication apparatus 151, and Wired Equivalent Privacy (WEP) is an encryption method unsupported by the communication apparatus 151. In a case where the CPU 103 determines that an encryption method used in the connection to the connected AP is an encryption method supported by the communication apparatus 151 (YES in step S211), the processing proceeds to step S212. In a case where the CPU 103 determines that an encryption method used in the connection to the connected AP is not an encryption method supported by the communication apparatus 151 (NO in step S211), the processing proceeds to step S224. The determination can be performed at another timing. Specifically, for example, the determination can be performed after the CPU 103 determines in step S204 that a Wi-Fi connection is successfully established in step S203 (YES in step S204). In a case where the CPU 103 determines that an encryption method used in the connection to the connected AP is an encryption method supported by the communication apparatus 151, the processing proceeds to step S205. In a case where the CPU 103 determines that an encryption method used in the connection to the connected AP is not an encryption method supported by the communication apparatus 151, the processing proceeds to step S224.

Next, in step S212, the CPU 103 determines whether the encryption method used in the connection to the connected AP is an encryption method supported by Wi-Fi Easy Connect (supported by DPP). Examples of an encryption method that supports Wi-Fi Easy Connect are WPA2 and WPA3, and examples of an encryption method that does not support Wi-Fi Easy Connect are WPA and WEP. The CPU 103 can identify which encryption methods are supported by Wi-Fi Easy Connect, based on information stored in advance by the setting application or based on information obtained from the communication apparatus 151. In a case where the CPU 103 determines that the encryption method used in the connection to the connected AP is an encryption method supported by Wi-Fi Easy Connect (supported by DPP) (YES in step S212), the processing proceeds to step S213. In a case where the CPU 103 determines that the encryption method used in the connecting to the connected AP is not an encryption method supported by Wi-Fi Easy Connect (supported by DPP) (NO in step S212), the processing proceeds to step S224.

Next, in step S213, the CPU 103 determines whether a frequency band used in the connection to the connected AP is a frequency band supported by the communication apparatus 151, based on the capability information obtained in step S210. According to the present exemplary embodiment, there are a type of the communication apparatus 151 that supports both the 2.4- and 5-GHz frequency bands and a type of the communication apparatus 151 that supports the 2.4-GHz frequency band but does not support the 5-GHz frequency band.

The communication apparatus 151 cannot connect to an access point via a frequency band that is unsupported by the communication apparatus 151. Thus, for example, in a case where the frequency band used in the connection to the connected AP is the 5-GHz frequency band and the communication apparatus 151 does not support the 5-GHz frequency band, the CPU 103 determines that the frequency band used in the connection to the connected AP is not a frequency band supported by the communication apparatus 151 (NO in step S213). In a case where the CPU 103 determines that the frequency band used in the connection to the connected AP is a frequency band supported by the communication apparatus 151 (YES in step S213), the processing proceeds to step S214. In a case where the CPU 103 determines that the frequency band used in the connection to the connected AP is not a frequency band supported by the communication apparatus 151 (NO in step S213), the processing proceeds to step S224.

In step S214, the CPU 103 disconnects the Wi-Fi connection between the information processing apparatus 101 and the access point enabled by the communication apparatus 151 operating in the network setup mode.

Next, in step S215, the CPU 103 re-establishes the connection between the information processing apparatus 101 and the access point to which the information processing apparatus 101 is Wi-Fi connected when the setting operation is performed. In the network setup using Wi-Fi Easy Connect, information about an access point to which the information processing apparatus 101 is connected is transmitted when the network setup using Wi-Fi Easy Connect is executed. Thus, the foregoing processing is performed to prepare for the network setup using Wi-Fi Easy Connect in step S216.

Next, in step S216, the CPU 103 performs processing for the network setup using Wi-Fi Easy Connect based on the obtained Wi-Fi Easy Connect-related information. According to the present exemplary embodiment, the setting application does not perform the network setup using Wi-Fi Easy Connect directly but performs processing to activate an OS standard application program for Wi-Fi Easy Connect (hereinafter, the application program will be referred to as "application for Wi-Fi Easy Connect") as the processing for the network setup using Wi-Fi Easy Connect. Then, the application for Wi-Fi Easy Connect executes an application programming interface (API) for Wi-Fi Easy Connect and issues a Wi-Fi Easy Connect performance request to the OS, whereby the OS performs the network setup using Wi-Fi Easy Connect. Alternatively, the setting application can execute the API for Wi-Fi Easy Connect and issue a Wi-Fi Easy Connect performance request to the OS, and the processing for the network setup using Wi-Fi Easy Connect can be the Wi-Fi Easy Connect performance request. Details of the processing will be described below.

In step S217, the CPU 103 determines whether a connection is successfully established between the access point and the communication apparatus 151 using Wi-Fi Easy Connect. The determination is performed based on information indicating whether using Wi-Fi Easy Connect is canceled and information that is obtained from the communication apparatus 151 and indicates whether a connection is successfully established with the access point. In a case where the CPU 103 determines that a connection is successfully established between the access point and the communication apparatus 151 using Wi-Fi Easy Connect (YES in step S217), the processing is ended. In a case where the CPU 103 determines that establishment of a connection between the access point and the communication apparatus 151 using Wi-Fi Easy Connect is unsuccessful (NO in step S217), the processing proceeds to step S218.

In step S218, the CPU 103 determines whether a cause of the unsuccessful establishment of a connection between the access point and the communication apparatus 151 using Wi-Fi Easy Connect is a specific cause. According to the present exemplary embodiment, information about the cause of the unsuccessful establishment of the connection between the access point and the communication apparatus 151 using Wi-Fi Easy Connect is obtained from the communication apparatus 151, and the determination is performed based on the obtained information. Further, examples of the specific cause according to the present exemplary embodiment include an occurrence of an error in Wi-Fi Easy Connect communication (cause 1) and a situation where the encryption method used for a connection between the information processing apparatus 101 and the access point is an encryption method that is unsupported by the communication apparatus 151 (cause 2). Another example is a situation where the encryption method used for the connection between the information processing apparatus 101 and the access point is an encryption method that is unsupported by Wi-Fi Easy Connect (cause 3). An unsuccessful connection due to the cause 2 or 3 may occur in a case where the network setup using Wi-Fi Easy Connect is performed after the CPU 103 determines in step S221 that Wi-Fi Easy Connect-related information is obtained in step S220 (YES in step S221). This is due to the following reason. Specifically, unlike a case where the network setup using Wi-Fi Easy Connect is performed after step S215, capability information about the communication apparatus 151 is not obtained and the determinations in steps S211 and S212 are not performed in a case where the network setup using Wi-Fi Easy Connect is performed after the CPU 103 determines in step S221 that Wi-Fi Easy Connect-related information is obtained in step S220 (YES in step S221). In a case where the CPU 103 determines that a cause of the unsuccessful establishment of the connection between the access point and the communication apparatus 151 using Wi-Fi Easy Connect is a specific cause (YES in step S218), the processing proceeds to step S224. In a case where the CPU 103 determines that a cause of the unsuccessful establishment of the connection between the access point and the communication apparatus 151 using Wi-Fi Easy Connect is not a specific cause (NO in step S218), the processing is ended.

Steps S217 and S218 can be skipped. Specifically, for example, the processing can be ended after step S216 without performing steps S217 and S218. Further, in a case where the CPU 103 determines that establishment of a connection between the access point and the communication apparatus 151 using Wi-Fi Easy Connect is unsuccessful (NO in step S217), the processing can be ended without performing step S218.

Next, processing in step S219 that is performed in a case where the CPU 103 determines that the search result obtained in step S201 does not include an access point that is enabled by the communication apparatus 151 operating in the network setup mode (NO in step S202) or in a case where the CPU 103 determines that establishment of a Wi-Fi connection is unsuccessful in step S203 (NO in step S204) will be described below. In step S219, the CPU 103 determines whether the information processing apparatus 101 is Wi-Fi connected to the access point when the setting operation is performed. The determination is performed based on whether information about the access point is stored in the predetermined storage area. In a case where the CPU 103 determines that the information processing apparatus 101 is Wi-Fi connected to the access point when the setting operation is performed (YES in step S219), the processing proceeds to step S220. In a case where the CPU 103 determines that the information processing apparatus 101 is not Wi-Fi connected to the access point when the setting operation is performed (NO in step S219), the processing is ended.

In step S220, the CPU 103 attempts to obtain Wi-Fi Easy Connect-related information by a method different from the method used when the Wi-Fi Easy Connect-related information is obtained in step S207. Specifically, for example, the CPU 103 attempts to obtain Wi-Fi Easy Connect-related information by the QR code scanning described above. FIG. 3 illustrates an example of a screen for image capturing of a QR code displayed by the setting application. A frame 301 is displayed on a screen 300 for QR code image capturing, and the screen 300 further displays an image being captured by the camera unit of the information processing apparatus 101. A user operates the information processing apparatus 101 to fit an image of a QR code that is captured by the camera unit and displayed on the communication apparatus 151 within the frame 301. In a case where the QR code fitted within the frame 301 is detected, the CPU 103 analyzes the QR code and obtains Wi-Fi Easy Connect-related information. A configuration of obtaining Wi-Fi Easy Connect-related information is not limited to the foregoing configuration, and Wi-Fi Easy Connect-related information can be obtained from the communication apparatus 151 using, for example, NFC or Bluetooth® Low Energy. In a case where the communication apparatus 151 does not support Wi-Fi Easy Connect, the communication apparatus 151 cannot display QR codes or transmit Wi-Fi Easy Connect-related information using NFC or Bluetooth® Low Energy. In such a case, the CPU 103 receives a cancel operation from a user on the setting application to end the process. The screen 300 for QR code image capturing can be displayed by an application program (e.g., the application for Wi-Fi Easy Connect, another application program for image capturing, and the like) that is not the setting application.

Next, in step S221, the CPU 103 determines whether Wi-Fi Easy Connect-related information is obtained in step S220.

In a case where the CPU 103 determines that Wi-Fi Easy Connect-related information is obtained in step S220 (YES in step S221), the processing proceeds to step S216. In a case where the CPU 103 determines that Wi-Fi Easy Connect-related information is not obtained in step S220 (NO in step S221), the processing is ended. The CPU 103 determines that Wi-Fi Easy Connect-related information is not obtained in step S220 (NO in step S221), in a case where, for example, the QR code scanned in step S220 is not a QR code for Wi-Fi Easy Connect-related information or the QR code is unsuccessfully scanned. Further, in a case where the CPU 103 determines that Wi-Fi Easy Connect-related information is not obtained in step S220 (NO in step S221), the processing can proceed to step S224 instead of ending the process. In a case where the CPU 103 determines that Wi-Fi Easy Connect-related information is obtained in step S220 (YES in step S221), the CPU 103 can determine whether the encryption method used in the connection to the connected AP is an encryption method supported by Wi-Fi Easy Connect (supported by DPP). Then, in a case where the CPU 103 determines that the encryption method used in the connection to the connected AP is an encryption method supported by Wi-Fi Easy Connect, the processing proceeds to step S216. In a case where the CPU 103 determines that the encryption method used in the connection to the connected AP is not an encryption method supported by Wi-Fi Easy Connect, the processing is ended or proceeds to step S224. In such a case, the CPU 103 identifies which encryption methods support Wi-Fi Easy Connect based on the information stored in advance by the setting application.

Next, processing of step S222 that is performed in a case where the CPU 103 determines that Wi-Fi Easy Connect-related information is unsuccessfully obtained from the communication apparatus 151 in step S207 (NO in step S209) will be described below. In step S222, the CPU 103 disconnects Wi-Fi connection, enabled by the communication apparatus 151 operating in the network setup mode, between the information processing apparatus 101 and the access point.

Next, in step S223, the CPU 103 re-establishes the connection between the information processing apparatus 101 and the access point to which the information processing apparatus 101 is Wi-Fi connected when the setting operation is performed. Then, the processing proceeds to step S220 described above.

As described above, according to the present exemplary embodiment, in a case where Wi-Fi Easy Connect-related information cannot be obtained via the Wi-Fi connection between the information processing apparatus 101 and the communication apparatus 151 operating in the network setup mode, an attempt to obtain Wi-Fi Easy Connect-related information is performed using another method. Specifically, for example, an attempt to obtain Wi-Fi Easy Connect-related information by scanning a QR code is performed. Because of this configuration, the network setup using Wi-Fi Easy Connect can be executed even in a case where Wi-Fi Easy Connect-related information cannot be obtained via the Wi-Fi connection between the information processing apparatus 101 and the communication apparatus 151 operating in the network setup mode.

Next, processing in step S224 that is performed in a case where the CPU 103 determines that the information processing apparatus 101 is not Wi-Fi connected to the access point when the setting operation is performed or determines that the information processing apparatus 101 does not support Wi-Fi Easy Connect (NO in step S206), the CPU 103 determines that the communication apparatus 151 does not support Wi-Fi Easy Connect (NO in step S208), the CPU 103 determines that an encryption method used in the connection to the connected AP is not an encryption method supported by the communication apparatus 151 (NO in step S211), the CPU 103 determines that the encryption method used in the connection to the connected AP is not an encryption method supported by Wi-Fi Easy Connect (supported by DPP) (NO in step S212), the CPU 103 determines that the frequency band used in the connection to the connected AP is not a frequency band supported by the communication apparatus 151 (NO in step S213), or the CPU 103 determines that a cause of the unsuccessful establishment of the connection between the access point and the communication apparatus 151 using Wi-Fi Easy Connect is a specific cause (YES in step S218) will be described below. In step S224, the CPU 103 performs network setup of the communication apparatus 151 using a method different from using Wi-Fi Easy Connect. According to the present exemplary embodiment, the method different from using Wi-Fi Easy Connect is a method for network setup of the communication apparatus 151 using the network setup communication protocol that is different from the Wi-Fi Easy Connect protocol (DPP). Details of the processing will be described below. Then, the processing is ended.

Details of the procedure in the flowchart described above are not limited to the configuration described above. For example, the CPU 103 can end the process without attempting to obtain Wi-Fi Easy Connect-related information using another method, in a case where Wi-Fi Easy Connect-related information cannot be obtained via the Wi-Fi connection between the information processing apparatus 101 and the communication apparatus 151 operating in the network setup mode. Specific examples of a case where Wi-Fi Easy Connect-related information cannot be obtained via the Wi-Fi connection between the information processing apparatus 101 and the communication apparatus 151 operating in the network setup mode include a case where the CPU 103 determines that the search result obtained in step S201 does not include an access point that is enabled by the communication apparatus 151 operating in the network setup mode (NO in step S202), a case where the CPU 103 determines that a Wi-Fi connection is unsuccessfully established in step S203 (NO in step S204), and a case where the CPU 103 determines that Wi-Fi Easy Connect-related information is unsuccessfully obtained from the communication apparatus 151 in step S207 (NO in step S209). Specifically, in a case where the CPU 103 determines that the search result obtained in step S201 does not include an access point that is enabled by the communication apparatus 151 operating in the network setup mode (NO in step S202), the CPU 103 determines that a Wi-Fi connection is unsuccessfully established in step S203 (NO in step S204), or the CPU 103 determines that Wi-Fi Easy Connect-related information is unsuccessfully obtained from the communication apparatus 151 in step S207 (NO in step S209), the process can be ended without performing the rest of the process (steps S219 to S223).

Further, for example, the two determinations of steps S208 and S209 are performed after step S207 in the above-described configuration, but the present exemplary embodiment is not limited to the configuration. For example, after step S207, determination of whether Wi-Fi Easy Connect-related information is obtained can be performed instead of the two determinations of steps S208 and S209. Then, in a case where it is determined that Wi-Fi Easy Connect-related information is obtained, the processing proceeds to step S210. In a case where it is determined that Wi-Fi Easy Connect-related information is not obtained, the processing proceeds to step S224 without performing the processing of steps S220 to S223.

According to the present exemplary embodiment, the encryption methods supported by the communication apparatus 151 include an encryption method supported by Wi-Fi Easy Connect. Thus, the determination of step S211 can be skipped. Specifically, for example, after step S210, the determination of step S212 can be performed without performing the determination of step S212.

Further, a configuration in which the encryption methods supported by Wi-Fi Easy Connect include an encryption method supported by the communication apparatus 151 can be employed, which is a case, for example, where WPA3 is the only encryption method supported by the communication apparatus 151 and WPA2 and WPA3 are the encryption methods supported by Wi-Fi Easy Connect. In such a case, the determination of step S212 can be skipped. Specifically, for example, after the CPU 103 determines that an encryption method used in the connection to the connected AP is an encryption method supported by the communication apparatus 151 (YES in step S211), the processing of step S214 can be performed without performing the determination of step S212.

Figure 4:
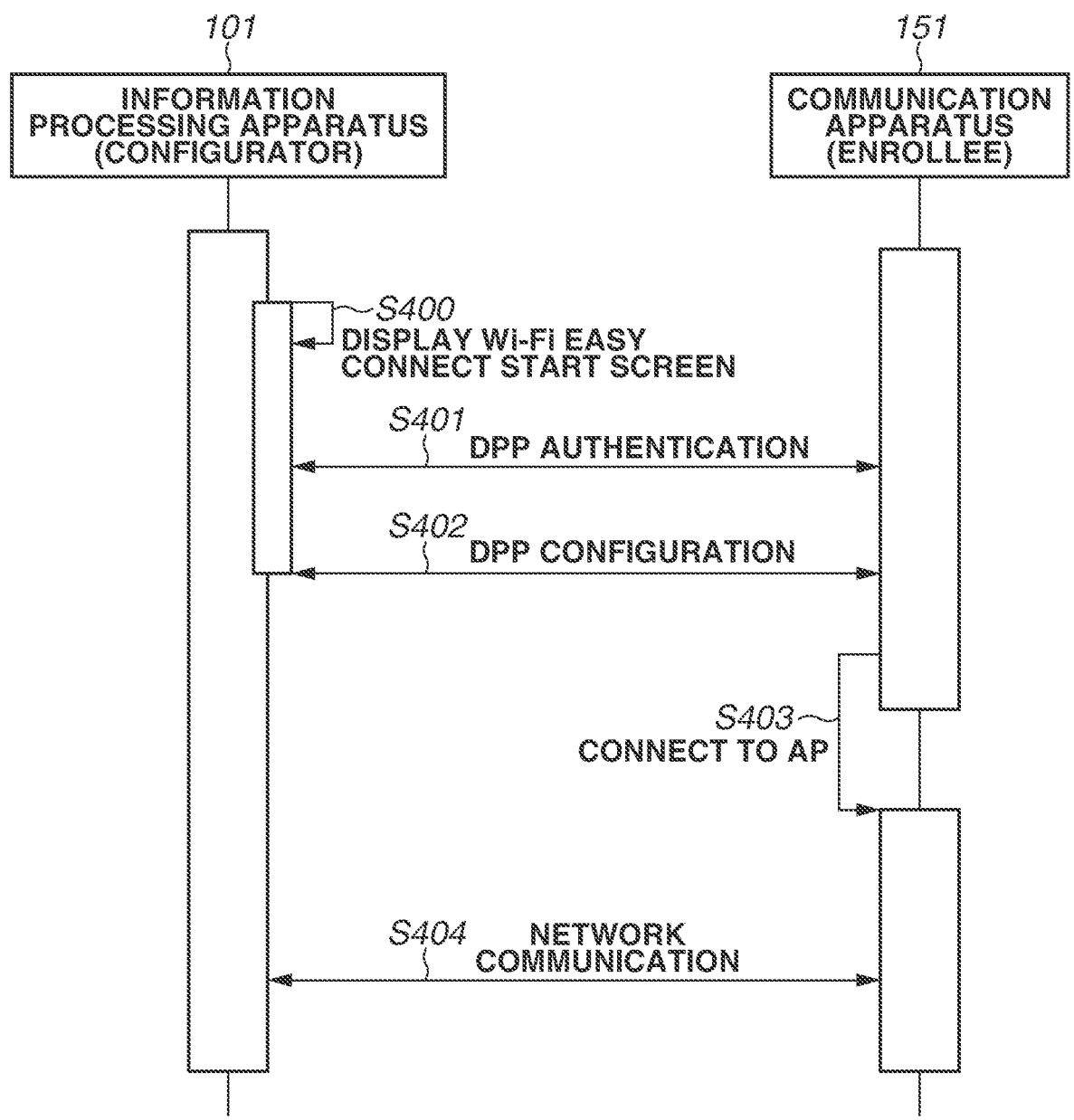
FIG. 4 is a sequence diagram illustrating a process that is performed by the information processing apparatus and the communication apparatus.

A process performed by the information processing apparatus 101 and the communication apparatus 151 in step S216 will be described below with reference to FIG. 4. A sequence illustrated in FIG. 4 is realized by, for example, the CPU 103 of the information processing apparatus 101 and the CPU 154 of the communication apparatus 151 reading programs stored in the ROM 104 and the ROM 152, respectively, or an external storage device to the RAM 105 and the RAM 153, respectively, and executing the read programs.

First, in step S400, the information processing apparatus 101 starts the network setup using Wi-Fi Easy Connect using DPP by a function of the OS. Specifically, first, the information processing apparatus 101 activates the application for Wi-Fi Easy Connect by instructing the OS from the setting application to activate the application for Wi-Fi Easy Connect. Consequently, the application for Wi-Fi Easy Connect operates in the foreground, and the setting application operates in the background. Execution of the instruction, for example, corresponds to an instruction to perform the network setup using Wi-Fi Easy Connect.

Figure 5:
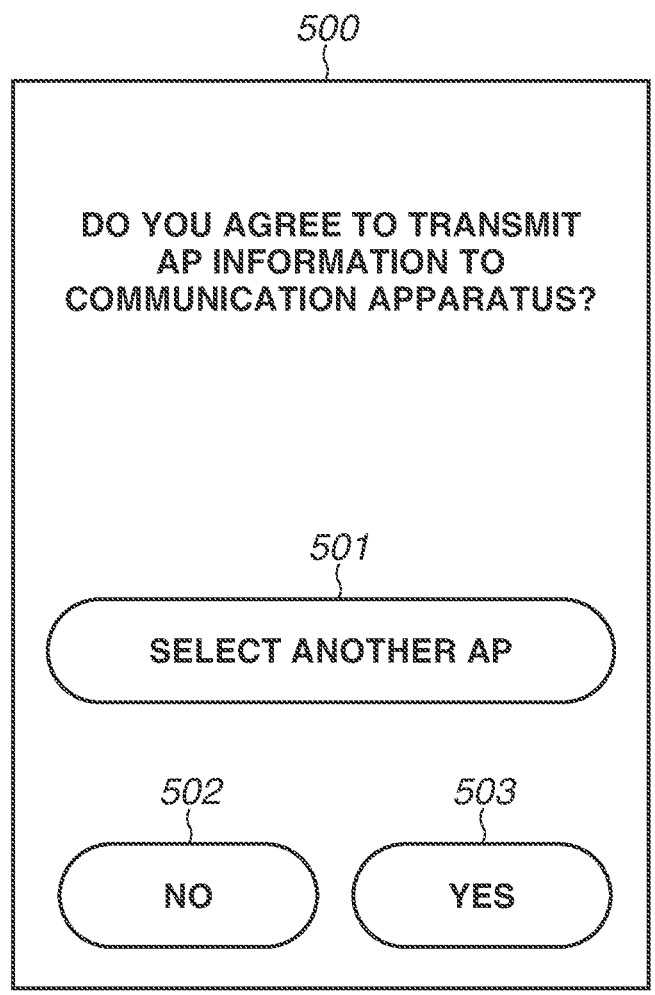
FIG. 5 illustrates an example of a Wi-Fi Easy Connect start screen.

Then, the information processing apparatus 101 displays a Wi-Fi Easy Connect start screen by the application for Wi-Fi Easy Connect. The application for Wi-Fi Easy Connect is a program that is pre-installed in the information processing apparatus 101 and is provided by a vendor of the OS of the information processing apparatus 101. In a case where the application for Wi-Fi Easy Connect is activated, Wi-Fi Easy Connect-related information obtained by the setting application is provided to the application for Wi-Fi Easy Connect. FIG. 5 illustrates an example of the Wi-Fi Easy Connect start screen displayed by the application for Wi-Fi Easy Connect. Areas 501, 502, and 503 are displayed on a Wi-Fi Easy Connect start screen 500.

The area 501 is an area for a change of an access point that is set as a Wi-Fi Easy Connect setting target. Before the area 501 is operated, the access point that is set as a Wi-Fi Easy Connect setting target is an access point to which the information processing apparatus 101 is currently connected. In a case where the area 501 is selected, the information processing apparatus 101 displays an access point list and sets an access point selected from the list by a user as a new Wi-Fi Easy Connect setting target. The access point list includes, for example, an access point discovered by the information processing apparatus 101 through the AP search and an access point to which the information processing apparatus 101 is previously connected. The area 502 is an area for a cancellation of the network setup using Wi-Fi Easy Connect, and the area 503 is an area for issuance of a Wi-Fi Easy Connect performance instruction. In a case where the area 502 is operated, the information processing apparatus 101 ends the process illustrated in the sequence diagram in FIG. 4, and the processing proceeds to step S217. In this case, it is determined that the network setup using Wi-Fi Easy Connect is unsuccessfully performed.

In a case where the information processing apparatus 101 determines that the area 503 is pressed, the processing proceeds to step S401.

In step S401, the application for Wi-Fi Easy Connect executes the API for Wi-Fi Easy Connect using Wi-Fi Easy Connect-related information and information about the access point set as a Wi-Fi Easy Connect setting target, whereby the OS is instructed to perform the network setup using Wi-Fi Easy Connect. Then, a process referred to as DPP authentication is performed between the information processing apparatus 101 and the communication apparatus 151 by the function of the OS. In DPP authentication, authentication information and information for use in information encryption are communicated between the information processing apparatus 101 and the communication apparatus 151, whereby the communication between the information processing apparatus 101 and the communication apparatus 151 is authenticated. Various types of information that are transmitted from the information processing apparatus 101 in the communication in DPP authentication are encrypted based on the Wi-Fi Easy Connect-related information obtained by the information processing apparatus 101 in the process illustrated in FIG. 2. Specifically, in the DPP authentication, first, the information processing apparatus 101 transmits an authentication request as a DPP network setup request. Next, the communication apparatus 151 operating in the DPP standby mode, which is a mode of the communication apparatus 151 waiting for an authentication request, receives the request transmitted from the information processing apparatus 101. The communication apparatus 151 having received the authentication request attempts to decrypt the received request using a decryption key held in the communication apparatus 151.

Then, in a case where the decryption is successfully performed, the communication apparatus 151 transmits an authentication response to the information processing apparatus 101 and authenticates the communication with the information processing apparatus 101. In a case where the information processing apparatus 101 fails to obtain accurate Wi-Fi Easy Connect-related information and thus inaccurately encrypts the information, the decryption by the communication apparatus 151 is unsuccessfully performed, and consequently, the authentication fails and no authentication response is transmitted. In response to receipt of the authentication response by the information processing apparatus 101, the DPP authentication is completed. Further, in the DPP authentication, the communication is performed using DPP.

Next, in step S402, a process referred to as DPP configuration is performed between the information processing apparatus 101 and the communication apparatus 151 by the function of the OS. In the DPP configuration, the information processing apparatus 101 transmits connection information for the connection to the access point set as a Wi-Fi Easy Connect setting target to the communication apparatus 151 using Wi-Fi Easy Connect. The connection information includes information indicating a SSID of the access point set as a Wi-Fi Easy Connect setting target, a password, and an encryption method. The password transmitted in the processing is information that is input by the user on a screen displayed by an OS-supported application when the connection between the information processing apparatus 101 and the access point is established.

Furthermore, the password is information that is held by the OS when the connection between the information processing apparatus 101 and the access point is established. Further, the password is information that is not held by the setting application.

Since the transmitted password is information held by the OS and the DPP configuration is a process performed by the OS, new user input of the password on a screen displayed by the setting application is unnecessary. According to the present exemplary embodiment, since the connection information is transmitted using Wi-Fi Easy Connect, the password is transmitted to the communication apparatus 151 via secure communication without receiving new user input of the password on the screen displayed by the setting application. The communication in the DPP configuration is also performed using DPP.

In step S403, the communication apparatus 151 ends the network setup mode and changes to the infrastructure mode. Then, the communication apparatus 151 attempts to connect to the access point corresponding to the connection information, based on the connection information obtained using Wi-Fi Easy Connect. In a case where a connection is successfully established, the communication apparatus 151 thereafter can perform communication via a network formed by the connected access point. The communication via the network formed by the connected access point is performed using a protocol (specifically, for example, Port 9100, SNMP, a vendor-specific protocol of a vendor of the communication apparatus 151) different from DPP. The communication apparatus 151 can transmit, to the information processing apparatus 101, information indicating whether the connection is successfully established with the access point corresponding to the connection information obtained using Wi-Fi Easy Connect. Further, in a case where the connection is unsuccessfully established with the access point corresponding to the connection information obtained using Wi-Fi Easy Connect, information indicating a cause of the unsuccessful establishment can be transmitted to the information processing apparatus 101. Further, the information transmission can be performed using DPP. Examples of a cause of an unsuccessful establishment of the connection to the access point corresponding to the connection information obtained using Wi-Fi Easy Connect include an error in Wi-Fi Easy Connect communication, a failure to discover the access point, and inaccurate Wi-Fi Easy Connect-related information obtained from the communication apparatus 151. Another example is that the encryption method used in the connection to the access point set as a Wi-Fi Easy Connect setting target is unsupported by the communication apparatus 151. A yet another example is that the encryption method used in the connection to the access point set as a Wi-Fi Easy Connect setting target is unsupported by Wi-Fi Easy Connect. The information processing apparatus 101 can display, on the display unit 108, information indicating whether the connection to the access point corresponding to the connection information obtained using Wi-Fi Easy Connect is successfully established. Further, in a case where the connection is unsuccessfully established with the access point corresponding to the connection information obtained using Wi-Fi Easy Connect, information indicating a cause of the unsuccessful establishment can be displayed on the display unit 108.

In step S404, in a case where the network setup using Wi-Fi Easy Connect is ended, the information processing apparatus 101 changes the application operating in the foreground from the application for Wi-Fi Easy Connect to the setting application. Then, the information processing apparatus 101 searches for the communication apparatus 151 on the network to which the information processing apparatus 101 belongs. The processing is realized by the setting application having received a notification of the end of the network setup using Wi-Fi Easy Connect from the OS. Then, in a case where the communication apparatus 151 is discovered, the information processing apparatus 101 transmits a request for capability information to the communication apparatus 151, and the communication apparatus 151 transmits the capability information to the information processing apparatus 101. Then, the information about the communication apparatus 151 is registered on the setting application, and the setting application can thereafter communicate with the communication apparatus 151. Specifically, for example, the setting application can transmit a print job to the communication apparatus 151. In this process, in a case where the information processing apparatus 101 belongs to the network formed by the access point to which the communication apparatus 151 is connected using Wi-Fi Easy Connect, communication with the communication apparatus 151 can be performed via the access point. In a case where communication cannot be performed between the information processing apparatus 101 and the communication apparatus 151, which is a case, for example, where the access point to which the communication apparatus 151 is connected is not the access point to which the information processing apparatus 101 is connected, the processing of requesting and obtaining capability information is skipped. The communication in step S404 is performed using, for example, a communication protocol different from DPP and the network setup communication protocol. Then, the information processing apparatus 101 ends the process illustrated in the sequence diagram, and the processing proceeds to step S217.

While the application for Wi-Fi Easy Connect displays the Wi-Fi Easy Connect start screen and the application for Wi-Fi Easy Connect instructs the OS to perform the network setup using Wi-Fi Easy Connect by executing the API for Wi-Fi Easy Connect in the above-described configuration, the present exemplary embodiment is not limited to the configuration. For example, the setting application can display the Wi-Fi Easy Connect start screen. Further, the setting application can instruct the OS to perform the network setup using Wi-Fi Easy Connect by executing the API for Wi-Fi Easy Connect.

Figure 6:
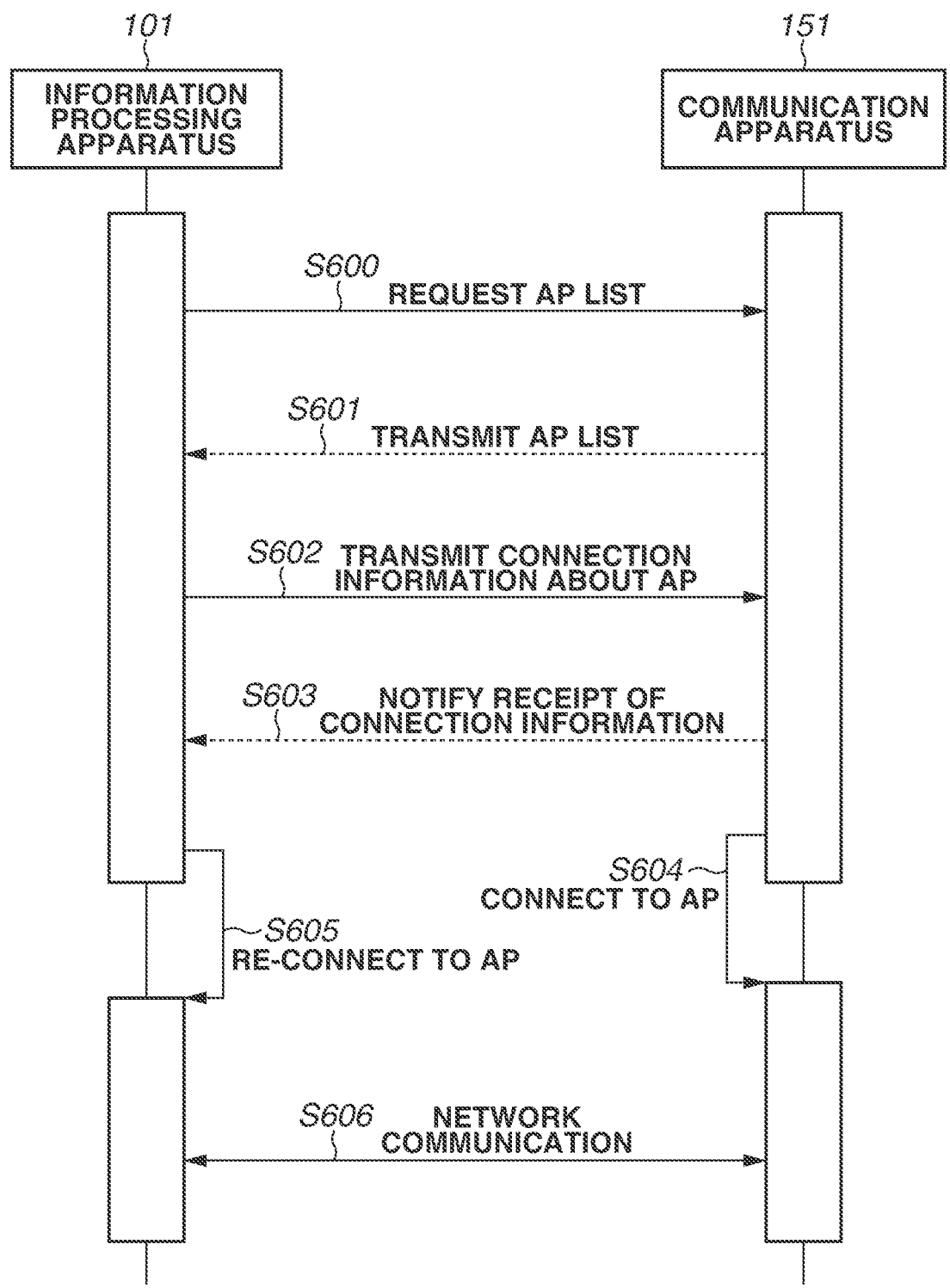
FIG. 6 is a sequence diagram illustrating a process that is performed by the information processing apparatus and the communication apparatus.

Next, the process performed by the information processing apparatus 101 and the communication apparatus 151 in step S224 will be described below with reference to FIG. 6. A sequence illustrated in FIG. 6 is realized by, for example, the CPU 103 of the information processing apparatus 101 and the CPU 154 of the communication apparatus 151 reading programs stored in the ROM 104 and the ROM 152, respectively, or an external storage device to the RAM 105 and the RAM 153, respectively, and executing the read programs. As described above, the network setup communication protocol is used in the communication via the Wi-Fi connection between the information processing apparatus 101 and the communication apparatus 151 operating in the network setup mode.

In step S600, the information processing apparatus 101 transmits, by the setting application, a request for an access point list to the communication apparatus 151 via the Wi-Fi connection between the information processing apparatus 101 and the communication apparatus 151 operating in the network setup mode.

Next, in step S601, the communication apparatus 151 transmits an access point list to the information processing apparatus 101 via the Wi-Fi connection between the information processing apparatus 101 and the communication apparatus 151 operating in the network setup mode. The list transmitted in this step is a list of one or more access points that are discovered by the AP search performed by the communication apparatus 151 and to which the communication apparatus 151 is connectable.

Next, in step S602, the information processing apparatus 101 transmits connection information about an access point included in the received list to the communication apparatus 151 via the Wi-Fi connection between the information processing apparatus 101 and the communication apparatus 151 operating in the network setup mode.

The above-described processing is realized by the setting application controlling the information processing apparatus 101 to transmit connection information about one of the access point included in the received list. In the processing, specifically, in a case where the received list includes the connected AP, the information processing apparatus 101 transmits connection information about the connected AP. According to the present exemplary embodiment, since the list includes only the access points to which the communication apparatus 151 is connectable, the case where the received list includes the connected AP is, in other words, a case where the communication apparatus 151 is connectable to the connected AP. In a case where the received list does not include the connected AP, the information processing apparatus 101 displays the received list to receive user's selection of an access point from the list.

Then, the information processing apparatus 101 transmits connection information about the selected access point. According to the present exemplary embodiment, since the list includes only the access points to which the communication apparatus 151 is connectable, the case where the received list does not include the connected AP is, in other words, a case where the communication apparatus 151 is unconnectable to the connected AP. The list does not include access points that are connectable using an encryption method unsupported by the communication apparatus 151 because the communication apparatus 151 are unconnectable to the access points. Further, the list does not include access points that are connectable using a frequency band unsupported by the communication apparatus 151, because the communication apparatus 151 is unconnectable to the access points. Thus, the processing in step S224 that is performed in a case where the CPU 103 determines that an encryption method used in the connection to the connected AP is not an encryption method supported by the communication apparatus 151 (NO in step S211) or the CPU 103 determines that the frequency band used in connecting to the connected AP is not a frequency band supported by the communication apparatus 151 (NO in step S213), connection information about an access point different from the connected AP is transmitted. In a case where the CPU 103 determines that the encryption method used in the connection to the connected AP is not an encryption method supported by Wi-Fi Easy Connect (supported by DPP) (NO in step S212), since the connected AP and the communication apparatus 151 may be connectable to each other, connection information about the connected AP may be transmitted or connection information about an access point different from the connected AP may be transmitted. The present exemplary embodiment is not limited to the foregoing configuration, and the list can be displayed each time and the information processing apparatus 101 receives user's selection of an access point each time. Before connection information is transmitted, the information processing apparatus 101 receives user input of a password for the connection to the access point on the screen displayed by the setting application. Then, the information processing apparatus 101 includes the received password in the connection information and transmits the connection information including the password.

In step S603, the communication apparatus 151 transmits a connection information receipt notification to the information processing apparatus 101 via the Wi-Fi connection between the information processing apparatus 101 and the communication apparatus 151 operating in the network setup mode.

In step S604, the communication apparatus 151 ends the network setup mode and changes to the infrastructure mode. Then, the communication apparatus 151 attempts to connect to the access point corresponding to the connection information obtained in step S602, based on the connection information. In a case where a connection is successfully established, the communication apparatus 151 can thereafter perform communication via the network formed by the connected access point.

In step S605, the information processing apparatus 101 re-connects, based on stored connection information by the setting application, to the access point to which the information processing apparatus 101 is connected when the setting operation is performed. The present exemplary embodiment is not limited to the configuration. Alternatively, for example, in a case where connection information about another access point different from the access point to which the information processing apparatus 101 is Wi-Fi connected when the setting operation is performed is transmitted to the communication apparatus 151, the information processing apparatus 101 can connect to the other access point.

In step S606, the information processing apparatus 101 searches for the communication apparatus 151 by the setting application on the network to which the information processing apparatus 101 belongs. Then, in a case where the communication apparatus 151 is discovered, the information processing apparatus 101 transmits a request for capability information to the communication apparatus 151, and the communication apparatus 151 transmits the capability information to the information processing apparatus 101. Then, the information about the communication apparatus 151 is registered on the setting application, and the setting application can thereafter communicate with the communication apparatus 151. Specifically, for example, the setting application can transmit a print job to the communication apparatus 151. In this process, in a case where the information processing apparatus 101 belongs to the network formed by the access point to which the communication apparatus 151 is connected by the network setup, communication with the communication apparatus 151 can be performed via the access point. In a case where communication cannot be performed between the information processing apparatus 101 and the communication apparatus 151, which is a case, for example, where the access point to which the communication apparatus 151 is connected is not the access point to which the information processing apparatus 101 is connected, the processing of requesting and obtaining capability information is skipped. The communication in step S606 is performed using, for example, a communication protocol different from DPP and the network setup communication protocol. Then, the information processing apparatus 101 ends the process illustrated in the sequence diagram.

Details of the process in the sequence diagram are not limited to those described above. For example, in a case where the received list does not include the access point to which the information processing apparatus 101 is Wi-Fi connected when the setting operation is performed, the transmission of connection information about the access point and the attempt to establish a connection between the communication apparatus 151 and the access point can be skipped.

Then, connection information about an access point that is enabled in the communication apparatus 151 during the AP mode can be received from the communication apparatus 151, and an attempt to establish a connection between the communication apparatus 151 operating in the AP mode and the information processing apparatus 101 can be made. In this case, after transmitting the connection information about the access point that is enabled in the communication apparatus 151 during the AP mode, the communication apparatus 151 ends the network setup mode and changes to the AP mode.

Figure 7:
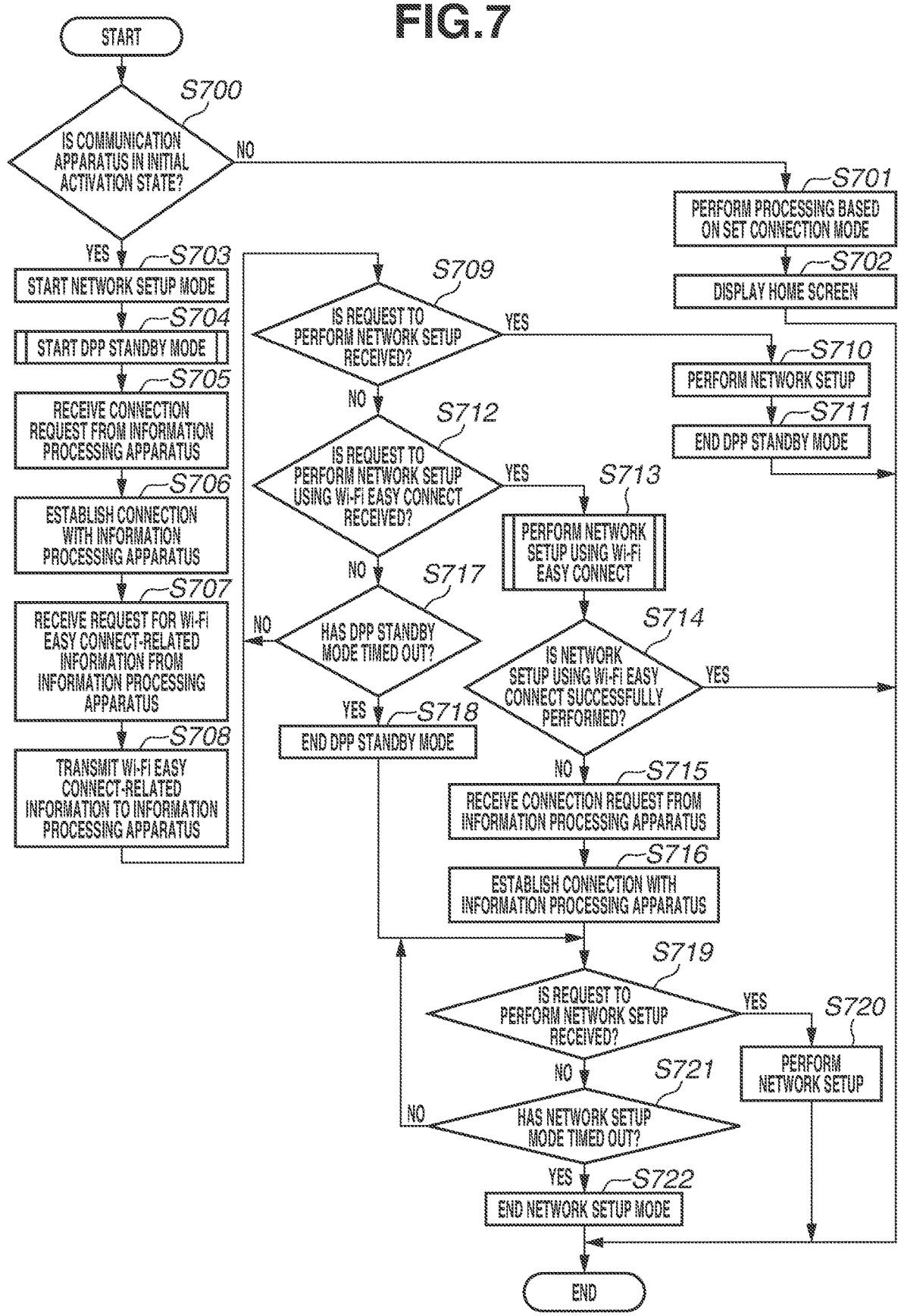
FIG. 7 is a flowchart illustrating a first setup process that is performed by the communication apparatus in the network setup processing.
Figure 8:
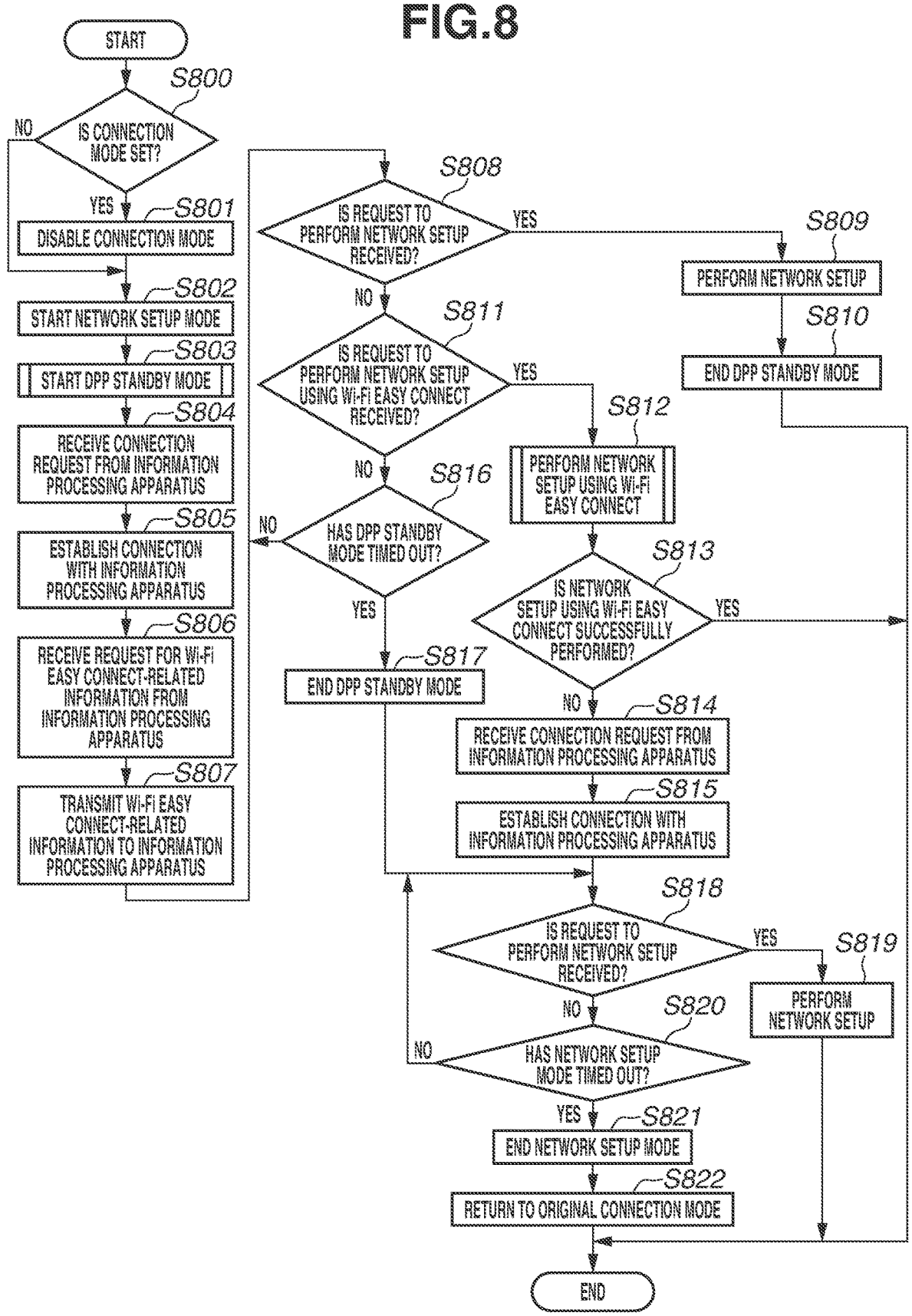
FIG. 8 is a flowchart illustrating a second setup process that is performed by the communication apparatus in the network setup processing.

FIGS. 7 and 8 are flowcharts each illustrating a procedure that is performed by the communication apparatus 151 in the network setup processing according to the present exemplary embodiment. Conditions of starting operation of the communication apparatus 151 in the setup mode according to the present exemplary embodiment include a first condition and a second condition. The first condition is that "a power-on operation is performed on the communication apparatus 151 with an initial setting process uncompleted and the communication apparatus 151 is powered on". The second condition is that "a predetermined network setup operation is performed on the communication apparatus 151 in a state where the communication apparatus 151 is powered on". A process in the setup mode that is started based on the first condition will be described below with reference to FIG. 7, and a process in the setup mode that is started based on the second condition will be described below with reference to FIG. 8.

First, a process in the setup mode that is started based on the first condition will be described below.

The communication apparatus 151 performs the initial setting process in response to a power-on operation performed in a shipped-from-factory state (at-arrival state) by a user (i.e., the first condition). The shipped-from-factory state corresponds to, for example, a state where the communication apparatus 151 has not completed the initial setting process. For example, the communication apparatus 151 is shipped from a factory without an ink tank or a print head attached. Thus, the communication apparatus 151 performs, for example, a process for making the communication apparatus 151 ready for use, such as a process of prompting a user to attach a supplied ink tank or a supplied print head to the communication apparatus 151, performing registration adjustment, and cleaning the print head, as the initial setting process. Whether the communication apparatus 151 is in the shipped-from-factory state is controlled using a flag (initial activation flag) stored in the ROM 152 or the memory. In a case where the initial setting process is completed, the communication apparatus 151 changes a state of the initial activation flag, and after the initial setting process is completed, the initial setting process is not activated even in a case where the communication apparatus 151 is powered on. In order to use the communication apparatus 151, the network setup for the communication apparatus 151 is desirably performed, and thus, the network setup processing is performed during the initial setting process according to the present exemplary embodiment.

FIG. 7 is a flowchart illustrating a process that is performed by the communication apparatus 151 in a case where the power-on operation is performed on the communication apparatus 151. The procedure of the flowchart in FIG. 7 is realized by, for example, the CPU 154 reading the setting application stored in the ROM 152 or the memory to the RAM 153 and executing the read setting application. The procedure of the flowchart in FIG. 7 is started in response to the power-on operation.

In step S700, the CPU 154 refers to the initial activation flag stored in the ROM 152 or the memory and determines whether the communication apparatus 151 is in an initial activation state. For example, at the time of shipment of the communication apparatus 151 from a factory, the initial activation flag is set to a specific value indicating that the communication apparatus 151 is in the initial activation state. In a case where the CPU 154 determines that the communication apparatus 151 is not in the initial activation state (NO in step S700), the processing proceeds to step S701. In a case where the CPU 154 determines that the communication apparatus 151 is in the initial activation state (YES in step S700), the processing proceeds to step S703. A case where the CPU 154 determines that the communication apparatus 151 is not in the initial activation state (NO in step S700) is a case where the communication apparatus 151 is powered on in a state where the initial setting process of the communication apparatus 151 is completed.

In step S701, the CPU 154 performs processing based on a set connection mode stored in the ROM 152 or the memory. For example, in a case where the communication apparatus 151 is wirelessly connected to an access point using Wi-Fi when the communication apparatus 151 is powered off by a user and an infrastructure connection mode is set, the CPU 154 connects to the access point.

In step S702, the CPU 154 displays a standby screen (home screen), and the procedure of the flowchart is ended.

In step S703, the CPU 154 causes the communication apparatus 151 to start operating in the network setup mode. Specifically, the CPU 154 enables the network setup access point. Further, in order to end the network setup mode after a predetermined time passes, the CPU 154 activates a timer for timeout detection of the network setup mode to count the time from the start of the operation in the network setup mode.

In step S704, the CPU 154 causes the communication apparatus 151 to start operating in the DPP standby mode. The DPP standby mode will be described below with reference to FIG. 9. Further, the CPU 154 activates a timer for timeout detection of the DPP standby mode to count the time from the start of the operation in the DPP standby mode.

In step S705, the CPU 154 receives a request to connect to the network setup access point from the information processing apparatus 101.

In step S706, the CPU 154 establishes a Wi-Fi connection. The Wi-Fi connection corresponds to the Wi-Fi connection between the information processing apparatus 101 and the communication apparatus 151 operating in the network setup mode.

In step S707, the CPU 154 receives a request for various types of Wi-Fi Easy Connect-related information from the information processing apparatus 101 via the Wi-Fi connection established in step S706. As described above, the network setup communication protocol is used in the communication via the Wi-Fi connection between the information processing apparatus 101 and the access point enabled by the communication apparatus 151 operating in the network setup mode.

In step S708, the CPU 154 transmits the various types of Wi-Fi Easy Connect-related information about the communication apparatus 151 to the information processing apparatus 101. For example, the various types of Wi-Fi Easy Connect-related information about the communication apparatus 151 includes Wi-Fi Easy Connect-related information described above and information indicating whether the communication apparatus 151 supports Wi-Fi Easy Connect. The information indicating whether the communication apparatus 151 supports Wi-Fi Easy Connect is information indicating whether the communication apparatus 151 supports DPP and is operating in the DPP standby mode described below. In a case where the communication apparatus 151 does not support Wi-Fi Easy Connect, information indicating that the communication apparatus 151 does not support Wi-Fi Easy Connect is transmitted, and Wi-Fi Easy Connect-related information is not transmitted. Alternatively, in a case where the communication apparatus 151 does not support Wi-Fi Easy Connect, it may be not necessary to transmit both of Wi-Fi Easy Connect-related information and information indicating whether the communication apparatus 151 supports Wi-Fi Easy Connect.

In step S709, the CPU 154 determines whether a request to perform network setup using the network setup protocol is received. Specifically, the CPU 154 determines whether a request for an access point list is received from the information processing apparatus 101. In a case where the CPU 154 determines that a request to perform network setup using the network setup protocol is received (YES in step S709), the processing proceeds to step S710. In a case where the CPU 154 determines that a request to perform network setup using the network setup protocol is not received (NO in step S709), the processing proceeds to step S712.

In step S710, the CPU 154 performs network setup using the network setup protocol. Specifically, the CPU 154 performs the process in FIG. 6 that is described as a process performed by the communication apparatus 151. In step S604 in FIG. 6, the CPU 154 ends the operation in the network setup mode and disables the network setup access point.

In step S711, the CPU 154 ends the DPP standby mode, and the procedure of the flowchart is ended. Either of the two operations, the operation in the network setup mode and the operation in the DPP standby mode, can be ended before the other after the network setup is performed. Specifically, the CPU 154 can end the operation in the network setup mode after the DPP standby mode is ended. The operation in the network setup mode and the operation in the DPP standby mode can be ended simultaneously.

In processing in step S712, which is the processing to be performed in a case where the CPU 154 determines that a request to perform network setup using the network setup protocol is not received (NO in step S709), the CPU 154 determines whether a request to perform network setup using DPP (Wi-Fi Easy Connect) is received. Specifically, the CPU 154 determines whether a request to perform network setup using DPP is received from the information processing apparatus 101 in the DPP authentication described above. In a case where the CPU 154 determines that a request to perform network setup using DPP (Wi-Fi Easy Connect) is received (YES in step S712), the processing proceeds to step S713. In a case where the CPU 154 determines that a request to perform network setup using DPP (Wi-Fi Easy Connect) is not received (NO in step S712), the processing proceeds to step S717. The CPU 154 can activate a timer for standby timeout detection of a request for network setup using DPP. In this case, the channel that is used in DPP communication can be changed in a case where a value counted by the timer for standby timeout detection of a request for network setup using Wi-Fi Easy Connect exceeds a threshold value. Further, in a case where a request to perform network setup using DPP is unsuccessfully received although the channel that is used in DPP communication is changed a predetermined number of times or more, the processing proceeds to step S718, and the CPU 154 ends the DPP standby mode and waits for a request to perform the network setup mode.

In step S713, the CPU 154 performs network setup using DPP. Specifically, the CPU 154 performs the process in FIG. 4 that is described as a process performed by the communication apparatus 151, and the procedure of the flowchart is ended. The network setup using DPP (Wi-Fi Easy Connect) will be described below with reference to FIG. 10.

In step S714, the CPU 154 determines whether the connection between the communication apparatus 151 and the access point to which the information processing apparatus 101 is connected is successfully established using Wi-Fi Easy Connect. In a case where a connection is successfully established between the communication apparatus 151 and the information processing apparatus 101, which is a case, for example, where the communication apparatus 151 connects to the access point to which the information processing apparatus 101 is connected, the CPU 154 determines that a connection is successfully established. In a case where the processing proceeds to step S1303 (NO in step S1302, S1305, S1306, S1307, or S1308) in FIG. 10, which illustrates detailed processing in step S713, and the processing is performed to end the DPP standby mode without connecting to the access point to which the information processing apparatus 101 is connected, the CPU 154 determines that a connection is unsuccessfully established. Further, in a case where the connected access point is not the access point to which the information processing apparatus 101 is connected, the CPU 154 determines that a connection is unsuccessfully established even when the communication apparatus 151 connects to the access point in step S1311. Alternatively, even when the access point is not an access point to which the information processing apparatus 101 is connected, the CPU 154 can determine that a connection is successfully established as long as the communication apparatus 151 is connected to an access point. In a case where the CPU 154 determines that the connection between the communication apparatus 151 and the access point to which the information processing apparatus 101 is connected is successfully established (YES in step S714), the procedure illustrated in the flowchart is ended. In a case where the CPU 154 determines that the connection between the communication apparatus 151 and the access point to which the information processing apparatus 101 is connected is unsuccessfully established (NO in step S714), the processing proceeds to step S715. The CPU 154 can determine that the network setup using Wi-Fi Easy Connect is successfully performed in a case where the processing does not proceed to step S1303 (YES in steps S1302, S1305, S1306, S1307, and S1308) in FIG. 10, which illustrates the detailed processing in step S713, and the CPU 154 can end the DPP standby mode and the network setup mode after connecting to the access point. A processing order can be determined as desired. Then, the CPU 154 re-establishes the connection between the communication apparatus 151 and the information processing apparatus 101, and in step S720, the CPU 154 performs network setup using the network setup protocol. Specifically, in a case where the connection between the access point and the communication apparatus 151 is unsuccessfully established by Wi-Fi Easy Connect, the network setup is performed using the network setup protocol. Thus, the establishment of the connection between the access point and the communication apparatus 151 is performed more reliably. In a case where the connection between the access point and the communication apparatus 151 is unsuccessfully established by the network setup using Wi-Fi Easy Connect, the network setup mode can be ended without performing network setup.

Steps S715 and S716 are similar to steps S705 and S706, respectively, so that the redundant descriptions are omitted.

In step S717, the CPU 154 determines whether a value counted by the timer for timeout detection of the DPP standby mode has exceeded a threshold value and the DPP standby mode has timed out. In a case where the CPU 154 determines that the value counted by the timer for timeout detection of the DPP standby mode has exceeded a threshold value and the DPP standby mode has timed out (YES in step S717), the processing proceeds to step S718. In a case where the CPU 154 determines that the value counted by the timer for timeout detection of the DPP standby mode has not exceeded a threshold value and the DPP standby mode has not timed out (NO in step S717), the processing returns to step S709.

In step S718, the CPU 154 ends the DPP standby mode, and the processing proceeds to step S719.

Steps S719 and S720 are similar to steps S709 and S710, respectively, so that the redundant descriptions are omitted. In a case where the CPU 154 determines that a request to perform network setup using the network setup protocol is received (YES in step S719), the processing proceeds to step S720. In a case where the CPU 154 determines that a request to perform network setup using the network setup protocol is not received (NO in step S719), the processing proceeds to step S721.

In step S721, the CPU 154 determines whether a value counted by the timer for timeout detection of the network setup mode has exceeded a threshold value and the network setup mode has timed out. In a case where the CPU 154 determines that the value counted by the timer for timeout detection of the network setup mode has exceeded a threshold value and the network setup mode has timed out (YES in step S721), the processing proceeds to step S722. In a case where the CPU 154 determines that the value counted by the timer for timeout detection of the network setup mode has not exceeded a threshold value and the network setup mode has not timed out (NO in step S721), the processing returns to step S719.

In step S722, the CPU 154 ends the operation in the network setup mode and disables the network setup access point. This processing is performed for the following reason. Specifically, since the network setup access point is an access point that does not require a password as described above, leaving the access point in the enabled state for a long time increases a possibility of receiving connection requests from inappropriate devices. The network setup access point can be an access point that requires a password. In such a case, a password for use in connecting to the network setup access point is a password that is fixed (i.e., a user cannot change). Then, the procedure of the flowchart is ended.

After completing the initial setting process, the CPU 154 changes the value of the initial activation flag stored in the ROM 152 or the memory from the value indicating the initial activation state to a value indicating a non-initial activation state. The non-initial activation state corresponds to a state where the initial setting process is completed. Consequently, because the initial setting process is completed, the procedure of the flowchart in FIG. 7 will not be performed the next or subsequent time the communication apparatus 151 is powered on by a user.

Next, a process in the setup mode that is started based on the second condition will be described below.

FIG. 8 is a flowchart illustrating a setup process that is performed by the communication apparatus 151. The flowchart in FIG. 8 is realized by, for example, the CPU 154 reading the setting application stored in the ROM 152 or the memory to the RAM 153 and executing the read setting application. The procedure of the flowchart in FIG. 8 is performed in a case where the second condition is satisfied.

In step S800, the communication apparatus 151 determines whether the connection mode is set for the communication apparatus 151 at least when the setting operation is performed. In a case where the communication apparatus 151 determines that the connection mode is set for the communication apparatus 151 at least when the setting operation is performed (YES in step S800), the processing proceeds to step S801. In a case where the communication apparatus 151 determines that the connection mode is not set for the communication apparatus 151 at least when the setting operation is performed (NO in step S800), the processing proceeds to step S802.

In step S801, the communication apparatus 151 disables the connection mode which is set for the communication apparatus 151 at least when the setting operation is performed. For example, in a case where the infrastructure connection mode is set for the communication apparatus 151 at least when the setting operation is performed and the communication apparatus 151 is wirelessly connected to the access point using Wi-Fi, the communication apparatus 151 disables the infrastructure connection mode and disconnects the connection to the access point. Further, the communication apparatus 151 obtains information about the connection mode which is set for the communication apparatus 151 at least when the setting operation is performed and stores the obtained information in the ROM 152 or the memory. This processing is performed because the information is to be used in the processing in step S818 described below in re-connection in the connection mode which is set for the communication apparatus 151 at least when the setting operation is performed. For example, information about the access point to which the communication apparatus 151 is wirelessly connected using Wi-Fi at least when the setting operation is performed is obtained, and the obtained information is stored in the ROM 152 or the memory. The information includes information (SSID, encryption method information) for the connection to the access point to which the communication apparatus 151 is wirelessly connected using Wi-Fi. In a case where the connection mode is not set at least when the setting operation is performed, the processing of obtaining connection mode information is skipped.

Steps S802 to S821 are similar to steps S703 to S722, respectively, so that redundant descriptions are omitted.

In step S822, the communication apparatus 151 performs re-connection in the connection mode that is set at least when the setting operation is performed, based on the information that is obtained in step S801 and indicates the connection mode which is set for the communication apparatus 151 at least when the setting operation is performed. For example, the communication apparatus 151 re-connects to the access point to which the communication apparatus 151 is wirelessly connected using Wi-Fi at least when the setting operation is performed. The communication apparatus 151 performs re-connection in the connection mode that is set when the setting operation is performed, even in a case where the DPP standby mode and the network setup mode are ended in step S810 or even in a case where the network setup using Wi-Fi Easy Connect is successfully performed in step S812.

The processing of step S704 in FIG. 7 and the processing of step S803 in FIG. 8 will be described below with reference to FIG. 9.

Figure 9:
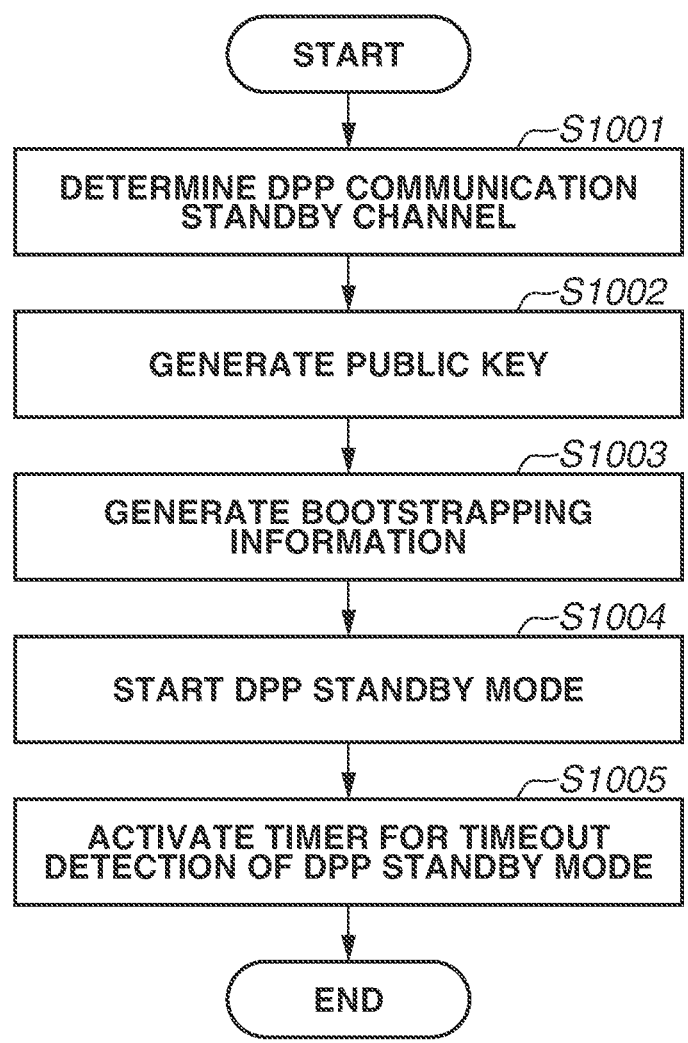
FIG. 9 is a flowchart illustrating a process of starting a Device Provisioning Protocol (DPP) standby mode.

FIG. 9 is a flowchart illustrating details of the processing of starting the DPP standby mode. The procedure of the flowchart in FIG. 9 is realized by, for example, the CPU 154 reading the setting application stored in the ROM 152 or the memory to the RAM 153 and executing the read setting application. The procedure of the flowchart in FIG. 9 is started in a case where, for example, the communication apparatus 151 starts the network setup mode. Since the network setup mode is started in a case where the first condition or the second condition is satisfied as described above, the procedure of the flowchart can be considered as a case where, for example, the first condition or the second condition is satisfied.

In step S1001, the CPU 154 determines a DPP communication standby channel. The DPP communication standby channel is a channel for waiting for a DPP network setup request transmitted from the information processing apparatus 101. The same channel is also used in the DPP configuration processing. Determination of which channel is to be used as the DPP communication standby channel can be made, for example, by a user via an operation screen of the communication apparatus 151.

In step S1002, the CPU 154 generates public key information, which is described above, for use to perform secure communication with the information processing apparatus 101.

In step S1003, the CPU 154 generates bootstrapping information described above. The bootstrapping information includes, for example, identification information (MAC address) about the communication apparatus 151, information about the DPP communication standby channel, and the public key information generated in step S1002.

In step S1004, the CPU 154 starts the DPP standby mode. Once the DPP standby mode is started, the communication apparatus 151 and the information processing apparatus 101 can perform communication in DPP authentication processing.

In step S1005, the CPU 154 activates the timer for timeout detection of the DPP standby mode. After the predetermined time passes from the start of the operation in the DPP standby mode, the CPU 154 ends the operation in the DPP standby mode. The operation in the DPP standby mode is ended to change to the network setup processing using the network setup protocol. Specifically, the CPU 154 ends the DPP standby mode in a case where the value counted by the timer for timeout detection of the DPP standby mode in step S704 or S803 exceeds the threshold value and the network setup mode times out.

Then, the processing proceeds to step S705 in FIG. 7 or step S804 in FIG. 8.

The processing of step S713 in FIG. 7 and the processing of step S812 in FIG. 8 will be described below with reference to FIG. 10.

Figure 10:
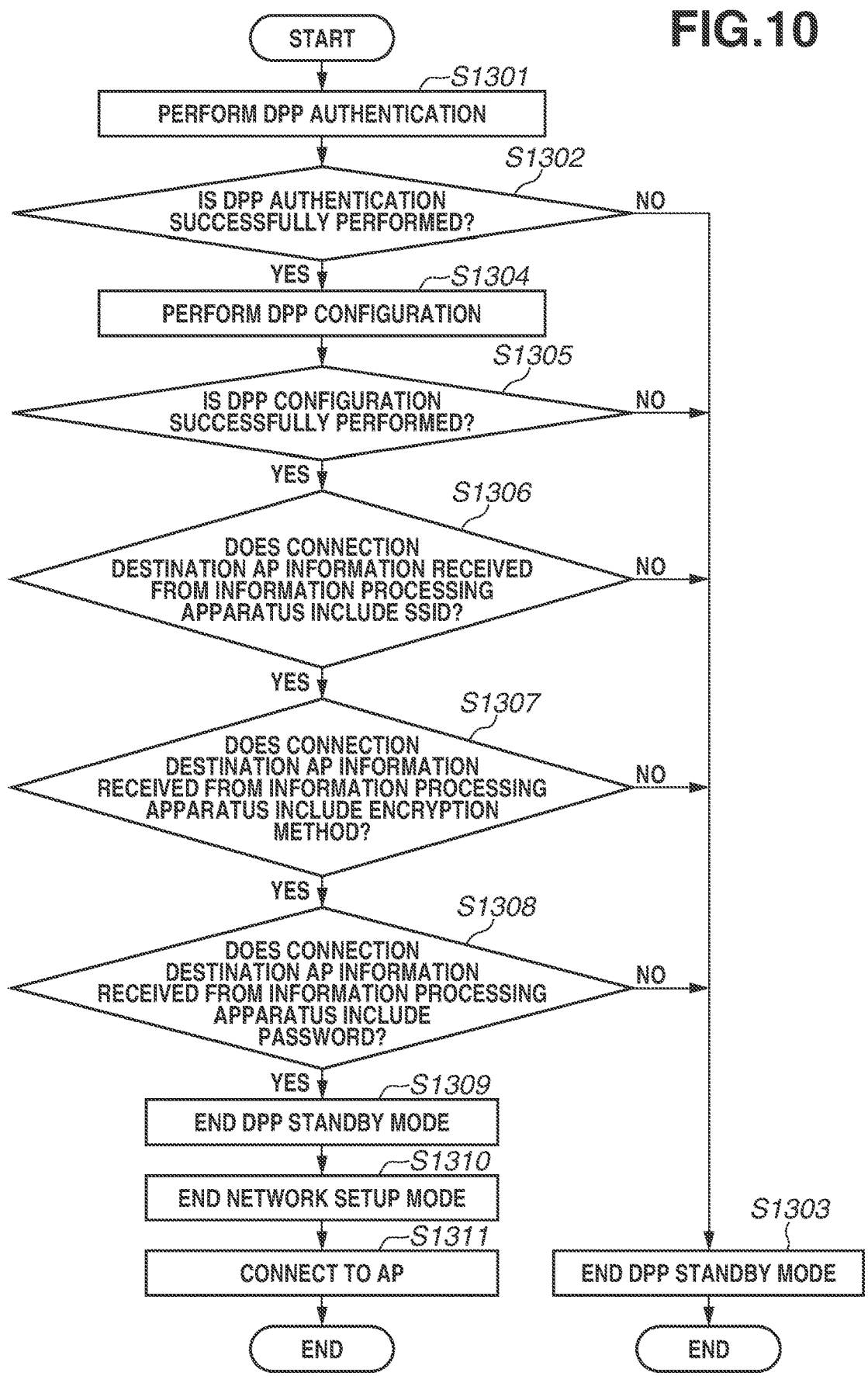
FIG. 10 is a flowchart illustrating a process of network setup using Wi-Fi Easy Connect.

FIG. 10 is a flowchart illustrating a process of performing network setup using DPP (Wi-Fi Easy Connect) and corresponds to the operations of the communication apparatus 151 in the sequence in FIG. 4. The flowchart in FIG. 10 is realized by, for example, the CPU 154 reading the setting application stored in the ROM 152 or the memory to the RAM 153 and executing the read setting application. The procedure of the flowchart in FIG. 10 is started in response to the communication apparatus 151 receiving a request to perform network setup using Wi-Fi Easy Connect in the DPP authentication processing from the information processing apparatus 101.

In step S1301, the CPU 154 performs the DPP authentication processing. In DPP authentication processing, authentication information and information for use in encrypting information are communicated between the information processing apparatus 101 and the communication apparatus 151, whereby the communication between the information processing apparatus 101 and the communication apparatus 151 is authenticated as described above. Communication in the DPP authentication processing is performed using DPP.

In step S1302, the CPU 154 determines whether the DPP authentication processing with the information processing apparatus 101 is successfully performed. As described above, various types of information transmitted from the information processing apparatus 101 via the communication in the DPP authentication processing are encrypted by the information processing apparatus 101 based on the Wi-Fi Easy Connect-related information obtained in the process in FIG. 2. In a case where the CPU 154 successfully decrypts the information received from the information processing apparatus 101 using the decryption key held in advance, the CPU 154 authenticates the communication with the information processing apparatus 101. In a case where the information processing apparatus 101 fails to obtain accurate Wi-Fi Easy Connect-related information and thus inaccurately encrypts the information, the decryption by the communication apparatus 151 is unsuccessfully performed, and consequently the authentication fails. Thus, in a case where the CPU 154 successfully authenticates the communication with the information processing apparatus 101, the CPU 154 determines that the DPP authentication processing is successfully performed, whereas in a case where the CPU 154 unsuccessfully authenticates the communication with the information processing apparatus 101, the CPU 154 determines that the DPP authentication processing is unsuccessfully performed. In a case where the CPU 154 determines that the DPP authentication processing with the information processing apparatus 101 is unsuccessfully performed (NO in step S1302), the processing proceeds to step S1303. In step S1303, the DPP standby mode is ended, and the procedure of the flowchart is ended. On the other hand, in a case where the communication apparatus 151 determines that the DPP authentication processing with the information processing apparatus 101 is successfully performed (YES in step S1302), the processing proceeds to step S1304.

In step S1304, the CPU 154 performs DPP configuration processing. In the DPP configuration processing, the CPU 154 receives the connection information for a connection to the access point set as a Wi-Fi Easy Connect setting target from the information processing apparatus 101 using Wi-Fi Easy Connect. The connection information includes the SSID of the access point set as a Wi-Fi Easy Connect setting target, the password, and the encryption method information.

In step S1305, the CPU 154 determines whether the DPP configuration processing with the information processing apparatus 101 is successfully performed. Specifically, in a case where the connection information for a connection to the access point set as a Wi-Fi Easy Connect setting target is received from the information processing apparatus 101 using Wi-Fi Easy Connect, the CPU 154 determines that the DPP configuration processing is successfully performed. In a case where the connection information for a connection to the access point set as a Wi-Fi Easy Connect setting target is not received from the information processing apparatus 101 using Wi-Fi Easy Connect, the CPU 154 determines that the DPP configuration processing is unsuccessfully performed. In a case where the CPU 154 determines that the DPP configuration processing with the information processing apparatus 101 is unsuccessfully performed (NO in step S1305), the processing proceeds to step S1303. In step S1303, the DPP standby mode is ended, and the procedure of the flowchart is ended. On the other hand, in a case where the CPU 154 determines that the DPP configuration processing with the information processing apparatus 101 is successfully performed (YES in step S1305), the processing proceeds to step S1306. In a case where the DPP configuration processing is successfully performed, the communication apparatus 151 obtains the SSID, the encryption method, and the password of the access point.

In step S1306, the CPU 154 determines whether access point information that is received from the information processing apparatus 101 and indicates the access point set as a Wi-Fi Easy Connect setting target includes the SSID. In a case where the CPU 154 determines that the access point information that is received from the information processing apparatus 101 and indicates the access point set as a Wi-Fi Easy Connect setting target does not include the SSID (NO in step S1306), the processing proceeds to step S1303. In step S1303, the DPP standby mode is ended, and the procedure of the flowchart is ended. On the other hand, in a case where the CPU 154 determines that the access point information that is received from the information processing apparatus 101 and indicates the access point set as a Wi-Fi Easy Connect setting target includes the SSID (YES in step S1306), the processing proceeds to step S1307.

In step S1307, the CPU 154 determines whether the access point information that is received from the information processing apparatus 101 and indicates the access point set as a Wi-Fi Easy Connect setting target includes the encryption method. In a case where the CPU 154 determines that the access point information that is received from the information processing apparatus 101 and indicates the access point set as a Wi-Fi Easy Connect setting target does not include the encryption method (NO in step S1307), the processing proceeds to step S1303. In step S1303, the DPP standby mode is ended, and the processing of the flowchart is ended. On the other hand, in a case where the CPU 154 determines that the access point information that is received from the information processing apparatus 101 and indicates the access point set as a Wi-Fi Easy Connect setting target includes the encryption method (YES in step S1307), the processing proceeds to step S1308.

In step S1308, the CPU 154 determines whether the access point information that is received from the information processing apparatus 101 and indicates the access point set as a Wi-Fi Easy Connect setting target includes the password. In a case where the CPU 154 connects to the access point using DPP communication, the CPU 154 can perform the determination based on whether the public key information is included instead of the password. In a case where a security setting of the access point set as a setting target is disabled, the password does not have to be included. In a case where the CPU 154 determines that the access point information that is received from the information processing apparatus 101 and indicates the access point set as a Wi-Fi Easy Connect setting target does not include the password (NO in step S1308), the processing proceeds to step S1303. In step S1303, the DPP standby mode is ended, and the procedure of the flowchart is ended. On the other hand, in a case where the CPU 154 determines that the access point information that is received from the information processing apparatus 101 and indicates the access point set as a Wi-Fi Easy Connect setting target includes the password (YES in step S1308), the processing proceeds to step S1309. In step S1309, the CPU 154 ends the DPP standby mode. Once the DPP standby mode is ended, the CPU 154 can no longer respond to a DPP authentication processing request from the information processing apparatus 101.

In step S1310, the CPU 154 ends the network setup mode and disables the network setup access point. Either of the two operations, the processing of ending the operation in the network setup mode in step S1310 and the processing of ending the operation in the DPP standby mode in step S1309, can be performed before the other. Specifically, the CPU 154 can end the operation in the network setup mode after the DPP standby mode is ended. The operation in the network setup mode and the operation in the DPP standby mode can be ended simultaneously. Further, the processing of ending the operation in the network setup mode or the processing of ending the operation in the DPP standby mode and the processing of connecting to the access point can be performed in any order.

In step S1311, the CPU 154 connects to the access point using the various types of information (SSID, password, encryption method) about the access point set as a Wi-Fi Easy Connect setting target from the information processing apparatus 101. Then, the procedure of the flowchart is ended.

As described above, according to the present exemplary embodiment, the communication apparatus 151 starts the DPP standby mode after starting the network setup mode. Thus, various types of Wi-Fi Easy Connect-related information about the communication apparatus 151 are automatically obtained at a timing at which the information processing apparatus 101 is to perform network setup using Wi-Fi Easy Connect. Further, a timing to start the network setup mode is a timing that a user wishes to perform the network setup of the communication apparatus 151. Thus, the network setup mode and the DPP standby mode are started at the same timing so that a user can perform the network setup of the communication apparatus 151 in one of the modes that the user wishes. This improves user-friendliness of the network setup function.

While, according to the present exemplary embodiment, in a case where the first condition or the second condition is satisfied, the DPP standby mode is started after the network setup mode is started, the present exemplary embodiment is not limited to the configuration. For example, in a case where the first condition or the second condition is satisfied, the network setup mode can be started after the DPP standby mode is started. Specifically, in a case where a condition to start the network setup mode and a condition to start the DPP standby mode are the same, a start order can be any order, and the both modes can be started simultaneously. Further, in response to one of the network setup mode and the DPP standby mode being started, the other mode can be started.

While, according to the present exemplary embodiment, in a case where network setup using Wi-Fi Easy Connect is unsuccessfully performed, the communication apparatus 151 ends the DPP standby mode, a configuration in which the DPP standby mode is not ended can be employed. Thus, the network setup can be performed again based on a request to perform network setup or a request to perform network setup using Wi-Fi Easy Connect from the information processing apparatus 101.

Further, according to the present exemplary embodiment, in a case where the communication apparatus 151 receives one of a request to perform network setup and a request to perform network setup using Wi-Fi Easy Connect, the communication apparatus 151 also enables the mode that relates to the other request. Specifically, in a case where a request to perform network setup is received, the DPP standby mode is enabled. Alternatively, in a case where one of a request to perform network setup and a request to perform network setup using Wi-Fi Easy Connect is received, the communication apparatus 151 can disable the mode that relates to the other request. For example, in a case where a request to perform network setup using Wi-Fi Easy Connect is received, the network setup mode can be ended. The network setup mode is restarted in a case where network setup using Wi-Fi Easy Connect is unsuccessfully performed. Thus, the network setup is performed again based on a request to perform network setup from the information processing apparatus 101. Further, in a case where one of a request to perform network setup and a request to perform network setup using Wi-Fi Easy Connect is received, the mode that relates to the other request is disabled to reduce unintended performance of network setup.

Furthermore, according to the present exemplary embodiment, in a case where the communication apparatus 151 is connectable to a predetermined access point that is a setting target, the information processing apparatus 101 is controlled to transmit connection information about the predetermined access point to the communication apparatus 151 using Wi-Fi Easy Connect. On the other hand, in a case where the communication apparatus 151 is unconnectable to the predetermined access point that is a setting target, the information processing apparatus 101 is controlled to transmit connection information about an access point different from the predetermined access point to the communication apparatus 151 through the network setup. Examples of a case where the communication apparatus 151 is connectable to the predetermined access point include a case where the communication apparatus 151 supports an encryption method for use in connecting to the predetermined access point and a case where the communication apparatus 151 supports a frequency band for use in connecting to the predetermined access point. Examples of a case where the communication apparatus 151 is unconnectable to the predetermined access point include a case where the communication apparatus 151 does not support the encryption method for use in connecting to the predetermined access point and a case where the communication apparatus 151 does not support the frequency band for use in connecting to the predetermined access point. According to the present exemplary embodiment, even when the communication apparatus 151 is connectable to the predetermined access point, in a case where Wi-Fi Easy Connect does not support the encryption method for use in connecting to the predetermined access point, the information processing apparatus 101 is controlled to transmit connection information about an access point different from the predetermined access point to the communication apparatus 151 through the network setup.

With the foregoing configuration, in a case where the connection between the predetermined access point and the communication apparatus 151 can be established using Wi-Fi Easy Connect, a simple setup process without user input of a password can be realized by using Wi-Fi Easy Connect. In a case where the connection between the predetermined access point and the communication apparatus 151 cannot be established using Wi-Fi Easy Connect, the setup is performed using a function different from Wi-Fi Easy Connect so that the establishment of the connection between the access point and the communication apparatus 151 is performed more reliably.

Other Exemplary Embodiments

While, according to the above-described exemplary embodiment, the connection information about the connected AP is transmitted using Wi-Fi Easy Connect and the determinations of steps S211 to S213 about the connected AP are performed, the above-described exemplary embodiment is not limited to the configuration. Connection information about an AP different from the connected AP can be transmitted, and/or the determinations can be performed on an AP different from the connected AP. Specifically, the AP different from the connected AP can be, for example, an access point to which the information processing apparatus 101 is not connected when the setting operation is performed but has been previously connected at a timing before the setting operation is performed. Further, the AP different from the connected AP can be an access point selected by a user from a list of access points to which the information processing apparatus 101 has been previously connected. Connection information about an access point to which the information processing apparatus 101 has been previously connected at any previous timing can be transmitted using Wi-Fi Easy Connect in a case where the connection information is stored in the OS.

According to the above-described exemplary embodiment, network setup is performed using Wi-Fi Easy Connect, whereby a simple setup process without user input of a password is realized. Alternatively, the network setup can also be performed using a different function not using Wi-Fi Easy Connect. For example, the network setup can be performed using a function that uses Hyper Text Transfer Protocol.

In such a case, a simple setup process without user input of a password is realized as in the case where Wi-Fi Easy Connect is used. Further, according to the above-described exemplary embodiment, the network setup is performed using the network setup communication protocol (e.g., SNMP). Alternatively, the network setup can be performed using another function using a protocol different from the network setup communication protocol. For example, the network setup can be performed using a function that uses Hyper Text Transfer Protocol. While connection information is transmitted via the Wi-Fi connection between the information processing apparatus 101 and the communication apparatus 151 in the network setup in step S224 according to the above-described exemplary embodiment, the exemplary embodiment is not limited to the foregoing configuration. For example, connection information can be transmitted via a connection established between the information processing apparatus 101 and the communication apparatus 151 using a communication method different from Wi-Fi, such as Bluetooth Low Energy, in the network setup. In this case, the information processing apparatus 101 can connect to the communication apparatus 151 using Bluetooth® Low Energy while maintaining the Wi-Fi connection to the connected AP. Specifically, connection information about the currently-connected access point can be transmitted as connection information about the connected AP. Also in the configuration, a communication protocol different from DPP is used.

Further, according to the above-described exemplary embodiment, various types of information is obtained via the Wi-Fi connection between the information processing apparatus 101 and the access point enabled by the communication apparatus 151 operating in the network setup mode in step S207. The exemplary embodiment is not limited to the foregoing configuration. The various types of information can be obtained by scanning a QR code as in step S220 or can be obtained via communication using another communication method, such as NFC or Bluetooth® Low Energy.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-141378, filed Aug. 31, 2021, and No. 2022-101445, filed Jun. 23, 2022, which are hereby incorporated by reference herein in their entirety.

What is claimed is:

1. A communication apparatus configured to communicate with an information processing apparatus, the communication apparatus comprising:
   a first control unit configured to perform, in a case where a predetermined operation is performed on the communication apparatus, first control to start both a first state to communicate with the information processing apparatus using a first protocol and a second state to communicate with the information processing apparatus using a second protocol different from the first protocol;
   a transmission unit configured to transmit predetermined information for use in communication with the information processing apparatus using the second protocol via communication with the information processing apparatus using the first protocol;

a communication unit configured to communicate with the information processing apparatus using the second protocol based on the predetermined information transmitted using the first protocol; and a second control unit configured to perform, in a case where connection information for use by the communication apparatus to connect to an access point is obtained from the information processing apparatus via communication with the information processing apparatus using the second protocol based on the predetermined information transmitted using the first protocol, second control to establish a connection between the communication apparatus and the access point by using the connection information.

2. The communication apparatus according to claim 1, wherein, in a case where the connection information for use by the communication apparatus to connect to the access point is obtained from the information processing apparatus via the communication with the information processing apparatus using the first protocol, the first state and the second state are both ended.

3. The communication apparatus according to claim 1, wherein, in a case where the connection information for use by the communication apparatus to connect to the access point is obtained from the information processing apparatus via the communication with the information processing apparatus using the second protocol, the first state and the second state are both ended.

4. The communication apparatus according to claim 1, wherein, in a case where the connection information for use by the communication apparatus to connect to the access point is obtained from the information processing apparatus via the communication with the information processing apparatus using the second protocol and the first state is ended, the second state is ended.

5. The communication apparatus according to claim 1, wherein, in a case where the connection information for use by the communication apparatus to connect to the access point is obtained from the information processing apparatus via the communication with the information processing apparatus using the second protocol and the second state is ended, the first state is ended.

6. The communication apparatus according to claim 1, wherein, in a case where the communication with the information processing apparatus using the second protocol is unavailable, the second state is ended.

7. The communication apparatus according to claim 1, wherein, in a case where a predetermined time to end the first state elapses, the first state is ended.

8. The communication apparatus according to claim 1, wherein, in a case where the predetermined operation is performed and the first state is started, the second state is started.

9. The communication apparatus according to claim 1, wherein, in a case where the predetermined operation is performed and the first state is started, the second state is started.

10. The communication apparatus according to claim 1, wherein, in a case where the predetermined operation is performed and the communication apparatus is in an initial activation state where the communication apparatus is first activated from a shipped-from-factory state by a user, the first state and the second state are started.

11. The communication apparatus according to claim 1, wherein, in a case where the predetermined operation is performed, the communication apparatus is in an initial activation state where the communication apparatus is first activated from a shipped-from-factory state by a user, and the first state is started, the second state is started.

12. The communication apparatus according to claim 1, wherein, in a case where the predetermined operation is performed, the communication apparatus is in an initial activation state where the communication apparatus is first activated from a shipped-from-factory state by a user, and the second state is started, the first state is started.

13. The communication apparatus according to claim 1, wherein, in a case where the predetermined operation is performed and an operation to perform the communication with the information processing apparatus using the first protocol is performed, the first state and the second state are started.

14. The communication apparatus according to claim 1, wherein, in a case where the predetermined operation is performed, an operation to perform the communication with the information processing apparatus using the first protocol is performed, and the first state is started, the second state is started.

15. The communication apparatus according to claim 1, wherein, in a case where the predetermined operation is performed, an operation to perform the communication with the information processing apparatus using the first protocol is performed, and the second state is started, the first state is started.

16. The communication apparatus according to claim 1, wherein the predetermined operation is a power-on operation performed on the communication apparatus to power on the communication apparatus.

17. The communication apparatus according to claim 1, wherein the predetermined operation is an operation to start the first state.

18. The communication apparatus according to claim 1,
wherein a first interface for use in the first state is different from a second interface for use in the second state,
wherein the communication apparatus includes a single wireless chip,
wherein an operation on the first interface and an operation on the second interface are realized by the single wireless chip, and
wherein, in a case where the communication apparatus operates in the first state and in the second state, the single wireless chip switches between a state for communication via the first interface and a state for communication via the second interface by time division.

19. The communication apparatus according to claim 1,
wherein a first interface for use in the first state is different from a second interface for use in the second state,
wherein the communication apparatus includes a plurality of wireless chips,
wherein an operation via the first interface is realized by a first wireless chip among the plurality of wireless chips, and an operation via the second interface is realized by a second wireless chip different from the first wireless chip among the plurality of wireless chips, and
wherein a state where the first wireless chip communicates via the first interface and a state where the second wireless chip communicates via the second interface are in operation in parallel with each other.

20. A method for controlling a communication apparatus configured to communicate with an information processing apparatus, the method comprising:

performing, in a case where a predetermined operation is performed on the communication apparatus, first control to start both a first state to communicate with the information processing apparatus using a first protocol and a second state to communicate with the information processing apparatus using a second protocol different from the first protocol;

transmitting predetermined information for use in communication with the information processing apparatus using the second protocol via communication with the information processing apparatus using the first protocol;

communicating with the information processing apparatus using the second protocol based on the predetermined information transmitted using the first protocol; and performing, in a case where connection information for use by the communication apparatus to connect to an access point is obtained from the information processing apparatus via the communication with the information processing apparatus using the second protocol based on the predetermined information transmitted using the first protocol, second control to establish a connection between the communication apparatus and the access point by using the connection information.

21. A non-transitory computer-readable storage medium that stores a program for causing a computer to function as each unit of the communication apparatus according to claim 1.

* * * * *